United States Patent [19]

Aikawa et al.

[11] Patent Number: 5,561,774
[45] Date of Patent: Oct. 1, 1996

[54] PARALLEL PROCESSING TYPE PROCESSOR SYSTEM WITH TRAP AND STALL CONTROL FUNCTIONS

[75] Inventors: Takeshi Aikawa; Mitsuo Saito; Kenji Minagawa; Kenji Takeda, all of Tokyo, Japan

[73] Assignee: Kabushiki Kaisha Toshiba, Kawasaki, Japan

[21] Appl. No.: 291,582

[22] Filed: Aug. 16, 1994

Related U.S. Application Data

[63] Continuation of Ser. No. 863,704, Apr. 3, 1992, abandoned.

[30] Foreign Application Priority Data

Apr. 5, 1991 [JP] Japan .................................. 3-073364

[51] Int. Cl.$^6$ ........................................................ G06F 9/46
[52] U.S. Cl. ..................... 395/375; 395/733; 364/DIG. 1
[58] Field of Search ....................................... 395/375, 725, 395/800

[56] References Cited

U.S. PATENT DOCUMENTS

| | | | |
|---|---|---|---|
| 4,200,912 | 4/1980 | Harrington et al. | 395/742 |
| 4,250,546 | 2/1981 | Boney et al. | 395/735 |
| 4,589,065 | 5/1986 | Auslander | 395/183.11 |
| 4,719,565 | 1/1988 | Moller | 395/733 |
| 4,742,449 | 5/1988 | Epstein et al. | 395/375 |
| 4,796,176 | 1/1989 | D'Amico et al. | 395/863 |
| 4,839,800 | 6/1989 | Barlow et al. | 395/737 |
| 4,903,264 | 2/1990 | Talgam et al. | 371/16.1 |
| 5,099,414 | 3/1992 | Cole et al. | 395/200.06 |
| 5,193,158 | 3/1993 | Kinney et al. | 395/375 |
| 5,193,187 | 3/1993 | Strout et al. | 395/650 |
| 5,247,628 | 9/1993 | Grohoski | 395/375 |

FOREIGN PATENT DOCUMENTS 58-144964  11/1983  Japan .

OTHER PUBLICATIONS

"Implementing Precise Interrupts in Pipelined Processors" Smith et al, IEEE, vol. 37, No. 5, May 1988, pp. 562–573.
"Organization of the Motorola 88110 Super Scalar RISC Processor" Dieffendorff et al, IEEE, Apr. 1992, pp. 40–63.

*Primary Examiner*—Parshotam S. Lall
*Assistant Examiner*—Viet Vu
*Attorney, Agent, or Firm*—Oblon, Spivak, McClelland, Maier & Neustadt, P.C.

[57] ABSTRACT

A parallel processing type processor system with trap and stall control functions capable of operating without increasing the cycle time, such that the lowering of the clock frequency in the system can be prevented. In the system, the processor units are controlled such that when an exception is caused in an execution of at least one of the instructions supplied to the processor units concurrently, the processings of all of the instructions supplied to the processor units concurrently are aborted. In addition, the processings of the instructions supplied to the processor units concurrently are stalled when it is not possible to deny a possibility for an occurrence of an exception in the execution of the instructions supplied to the processor units concurrently.

16 Claims, 17 Drawing Sheets

FIG. 8B

| | C | C+1 | C+2 | C+3 | C+4 | C+5 | C+6 |
|---|---|---|---|---|---|---|---|
| In | Fn | Dn | E(n) | M(n) | W(n) | | |
| In+1 | | | E(n+1) | M(n+1) | W(n+1) | | |
| In+2 | | | E(n+2) | M(n+2) | W(n+2) | | |
| In+3 | | | E(n+3) | M(n+3) | W(n+3) | | |
| | | F(n+4) | D(n+4) | E(n+4) | M(n+4) | W(n+4) | |
| | | | | E(n+5) | M(n+5) | W(n+5) | |
| | | | | E(n+6) | M(n+6) | W(n+6) | |
| | | | | E(n+7) | M(n+7) | W(n+7) | |
| | | | F(n+8) | D(n+8) | E(n+8) | M(n+8) | W(n+8) |
| | | | | | E(n+9) | M(n+9) | W(n+9) |
| | | | | | E(n+10) | M(n+10) | W(n+10) |
| | | | | | E(n+11) | M(n+11) | W(n+11) |

FIG. 8A

```
In-2    .............
In-1
In      fadd  fr1,fr2,fr3
In+1    load  r1,r2,O×20
In+2    load  r4,r1,O×30
In+3    fmul  fr4,fr5,fr6
In+4    .............
```

FIG.15

```
fadd    F    D    E1    E2      E3      M    W
                        |stall  |stall
                        ↓       ↓
Iadd              E     M       M       M    W
fmul              E1    E2      E2      E2   E3   W
------------------------------------------------------------
fadd    F    D    E1    E1      E1      E2   E3
Iadd                    E       E       E    M    W
fmul                    E1      E1      E1   E2   E3
```

FIG.16

```
fdiv  F  D  E1 E1 E1 ------E1 E2 E3 M  W
            ↓  ↓        ↓  ↓  ↓ stall
iadd        E  M  M  ------M  M  M  M  W
fadd        E1 E2 E2 ------E2 E2 E2 E3 W
```

FIG.20

| | | | | | | | | | | NOTE |
|---|---|---|---|---|---|---|---|---|---|---|
| stall1 | | 0 | 0 | 0 | 0 | 1 | 1 | 1 | 1 | |
| stall2 | | 0 | 0 | 1 | 1 | 0 | 0 | 1 | 1 | |
| FRbusy | | 0 | 1 | 0 | 1 | 0 | 1 | 0 | 1 | |
| F stage | | O | | | | × | | × | × | |
| D stage | | O | | | | × | | × | × | |
| ALU | E stage | O | | | | × | | × | × | |
| | M stage0 | O | | | | O | | × | × | EXECUTION COMPLETION STAGE |
| | M stage1 | O | | | | × | | × | × | EXECUTION COMPLETION STAGE |
| | W stage | O | | | | O | | O | O | |
| MUL/ DIV | E1₁ stage | O | | | | × | | × | × | |
| | E1₂ stage | O | | | | △ | | × | × | EXECUTION COMPLETION STAGE |
| | E1ʟ stage | O | | | | O | | O | O | |
| | E1ᵥᵥ stage | O | | | | O | | O | O | |
| FADD (FMUL) FAexch= NEGATE | E1 | O | | | | × | | × | × | |
| | E2 | O | | | | △ | | × | × | EXECUTION COMPLETION STAGE |
| | E3 | O | | | | O | | O | O | |
| | W stage | O | | | | O | | O | O | |
| FADD (FMUL) FAexch= ASSERT | E1 stage | O | IMPOSSIBLE | | | × | IMPOSSIBLE | × | × | |
| | E2 stage | O | | | | O | | O | × ← FADD OPERABLE |
| | E3 stage | O | | | | O | | O | O | |
| | M stage | O | | | | △ | | × | × | EXECUTION COMPLETION STAGE |
| | W stage | O | | | | O | | O | O | |
| FDIV FAexch= NEGATE | E1₁ stage | O | | | | × | | × | × | |
| | E1₂ stage | O | | | | △ | | × | × | EXECUTION COMPLETION STAGE |
| | E1ʟ stage | O | | | | O | | O | O | |
| | E2 stage | O | | | | O | | O | O | |
| | E3 stage | O | | | | O | | O | O | |
| | W stage | O | | | | O | | O | O | |
| FDIV FAexch= ASSERT | E1₁ stage | O | | | | × | | × | × | |
| | E1₂ stage | O | | | | O | | O | O | |
| | E1ʟ stage | O | | | | O | | O | O | |
| | E2 stage | O | | | | O | | O | O | |
| | E3 stage | O | | | | O | | O | O | |
| | M stage | O | | | | △ | | × | × | EXECUTION COMPLETION STAGE |
| | W stage | O | | | | O | | O | O | |
| BU | E stage | O | | | | × | | × | × | |
| | M stage | O | | | | △ | | × | × | |
| | W stage | O | | | | O | | O | O | |

O NOT STALLED
× STALLED
△ NOT STALLED IF stallv1 > submpc, STALLED OTHERWISE

PARALLEL PROCESSING TYPE PROCESSOR SYSTEM WITH TRAP AND STALL CONTROL FUNCTIONS

This application is a Continuation of application Ser. No. 07/863,704, filed on Apr. 3, 1992, now abandoned.

BACKGROUND OF THE INVENTION

1. Field of the Invention

The present invention relates to a parallel processing type processor system for performing parallel execution at instruction level, and more particularly, to trap and stall control functions in the parallel processing type processor system.

2. Description of the Background Art

In recent years, as a possible answer to a growing expectation for a high speed personal computer, a CPU called superscaler processor or VLIW (Very Long Instruction Word) which can perform parallel processing at machine language instruction level has been developed and already realized on a VLSI chip. In such a parallel processing CPU, the instructions of RISC are used as the basic instruction sets, and the processing performance is improved by fetching and executing a plurality of instructions concurrently. In particular, the superscaler processor has an architecture in which the conventional RISC for a sequential processing at instruction level can be realized and the compatibility at user program level can be maintained, so that it is attracting a large expectation from computer users.

Such a processor system capable of performing parallel processing at instruction level which adopts a conventional trap control method has a schematic configuration as shown in FIG. 1.

This configuration of FIG. 1 realizes a processor system capable of performing parallel processing at instruction level which has five step pipe line stages including F stage (Fetch), D stage (Decode), E stage(Execution), M stage (Memory access), and W stage (register Write back), in which each instruction is given in a length of one word (32 bits).

As shown in FIG. 1, the processor system comprises: an instruction memory 1 for storing instructions; an instruction issue unit 2 for fetching four instructions of four word boundary concurrently from the instruction memory 1 at the F stage, accounting for the data dependency relationship and control dependency relationship among the four fetched instructions at the D stage, and supplying executable instructions through instruction supply lines 20, 21, 22, and 23 at the E stage; an arithmetic logic units (ALU0 and ALU1) 3 and 4 for carrying out the arithmetic logic calculation and memory address calculation at the stage E according to the instructions supplied from the instruction supply lines 20 and 21, respectively; a floating point adder (FADD) 5 for carrying out the floating point addition and subtraction at the E stage according to the instruction supplied from the instruction supply line 22; a floating point multiplier (FMUL) 6 for carrying out the floating point multiplication and division at the E stage according to the instruction supplied from the instruction supply line 23; memory access units (MA0 and MA1) 7 and 8 for carrying out memory access operations with respect to a two port data memory 25 at the M stage according to the outputs of the ALU0 3 and ALU1 4, respectively; floating point exception check units (EC1 and EC2) 9 and 10 for carrying out exception check in the floating point calculations at the M stage according to the outputs of the FADD 5 and FMUL 6, respectively; and a multi-port register file 11 having twelve ports including four write ports for receiving the outputs of the MA0 7, MA1 8, EC1 9, and EC2 10 at the W stage, and eight read ports for supplying operand data to the ALU0 3, ALU1 4, FADD 5, and FMUL 6 through operand data supply lines 12 to 19 at the E stage.

In this configuration FIG. 1, the integer calculation exception trap such as a page fault or a overflow is generated by the MA0 7 and MA1 8, while the floating point calculation exception trap is generated by the EC1 9 and EC2 10.

In order to deal with such an exception trap, the processor system is further equipped with a trap cause register 30 for storing a cause of the trap generation; a trap address register 32 for storing an address of the instruction which caused the trap generation; and a trap control unit 33 for receiving the trap causes from the MA0 7, MA1 8, EC1 9, and EC2 10 transmitted through trap request signal lines 43 to 46, in response to which a trap signal is asserted through trap signal lines 34 to 38, while generating appropriate inputs for the trap cause register 30 and the trap address register 32 through signal lines 40 and 42, respectively.

The trap signal in the trap signal line 34 is transmitted to the instruction issue unit 2, ALU0 3, and ALU1 4 while the trap signals in the trap signal lines 35 to 38 are transmitted to the MA0 7, MA1 8, EC1 9, and EC2 10, respectively. In response to the trap signal from the trap control unit 33, an execution invalidation flag is activated in each element, so as to abort the processings of the instructions at the later pipe line stages while the instruction issue unit 2 starts the instruction fetch for the prescribed trap treatment routine in which the trap cause and the trap address stored in the trap cause register 30 and the trap address register 32 are utilized.

In further detail, the trap control unit 33 has a configuration shown in FIG. 2. Namely, the trap control unit 33 further comprises: an M stage program counter 1 (MPC) 51 for storing a common portion of word addresses of the instructions currently executed at the M stage in which two least significant bits of the addresses of the instructions are omitted; M stage sub-program counters (submpc1, submpc2, submpc3, submpc4) 53, 54, 55, and 56 for storing individual portions of word addresses of the instructions currently executed at the M stage, indicating two least significant bits of the addresses of the instructions currently executed by the MA0 7, MA1 8, EC1 9, and EC2 10, respectively; and a trap data generation unit 57 which outputs the smallest entry among the M stage sub-program counters 53 to 56 as an output 47 to be combined with the entry of the MPC 51 to generate the trap address 42 to be supplied to the trap address register 32, and the trap cause transmitted through one of the trap request signal lines 43 to 46 corresponding to the M stage sub-program counter 53 to 56 having the smallest entry as the trap cause 40 to be supplied to the trap cause register 30, while generating the trap signals for the trap signal lines 34 to 38.

Here, the trap signal in the trap signal line 34 is asserted whenever a trap cause is received from any one of the trap request signal lines 43 to 46, whereas each of the trap signals 35 to 38 is asserted when the trap request is received from one of the trap request signal lines 43 to 46 and the corresponding one of the M stage sub-program counter 53 to 56 has the entry which is equal to or larger than the entry in one of the M stage sub-program counter 53 to 56 from which the trap request is received.

FIG. 3A shows an exemplary program to be executed by the processor system of FIG. 1, and FIG. 3B shows a progress of the pipe line processing in the processor system of FIG. 1 using the conventional trap control method described above, in which the page fault occurred at the "load" instruction when the program of FIG. 3A is executed, where the shaded region indicates the instructions aborted. As shown in FIG. 3B, in the conventional trap control, when the trap is generated by the execution of the n+2-th "load" instruction during the course of the execution of the program, only those instructions whose instruction numbers are equal to or larger than n+2 are aborted.

However, in such a conventional trap control method, when the trap request is indicated through the trap request line 44 as the page fault is detected by the MA1 8 at the cycle C+3, the trap signals in the trap signal lines 35 to 38 cannot be determined until the entries in the M stage sub-program counters 53 to 56 are compared with each other to determine which is larger than which, so that there has been a problem that the cycle time must have a considerable length to accomodate such comparison operations, and this in turn caused the lowering of the clock frequency.

It is further to be noted that the RISC requires a configuration having a simple data path and a simple control circuit, and the data path of the superscaler processor having several of the data paths of RISC is not so complicated, but the control circuit of the superscaler processor can be quite complicated because of the instruction supply control and other control operations required. In particular, a hardware for treating a case of so called exception in which the continuation of the processing becomes impossible without the support from the software such as an OS can be very complicated, and a designing of such a hardware can be very time-consuming, so that such a hardware has often been a critical path in realizing the superscaler processor.

SUMMARY OF THE INVENTION

It is therefore an object of the present invention to provide a parallel processing type processor system such as a superscaler processor, incorporating trap and stall control functions capable of operating without increasing the cycle time, such that the lowering of the clock frequency in the system can be prevented.

According to one aspect of the present invention there is provided a parallel processing type processor system, comprising: N processor means for processing instructions concurrently, where N is an integer; instruction supply means for supplying instructions to be executed by said N processor means concurrently; and trap control means for controlling said N processor means such that when M instructions are supplied from the instruction supply means to said N processor means concurrently, where M is an integer and N≧M, and when an exception is caused in an execution of at least one of said M instructions, processings of all of said M instructions supplied to said N processor means concurrently are aborted.

According to another aspect of the present invention there is provided a method of controlling a parallel processing type processor system, comprising the steps of: supplying M instructions to be executed by N processor means of the system concurrently, where N≧M; and controlling said N processor means such that when M instructions are supplied to said N processor means concurrently, and when an exception is caused in an execution of at least one of said M instructions, processings of all of said M instructions supplied to said N processor means concurrently are aborted.

Other features and advantages of the present invention will become apparent from the following description taken in conjunction with the accompanying drawings.

BRIEF DESCRIPTION OF THE DRAWINGS

FIG. 8A is an exemplary program to be executed in the parallel processing type processor system of FIG. 7.

FIG. 8B is a diagram of a progress of pipe line processing in the parallel processing type processor system of FIG. 7 when the stall request occurred in the execution of the program of FIG. 8A.

FIG. 15 is a timing chart diagram showing an exemplary cases of a stall due to the FAexch (FADD exception check) signal in the parallel processing type processor system of FIG. 9

FIG. 16 is a timing chart diagram showing an exemplary cases of a stall due to the FDexch (FDIV exception check) signal in the parallel processing type processor system of FIG. 9

FIG. 20 is a table summarizing operations of pipe lines in the parallel processing type processor system of FIG. 9 in response to the stall control operation.

DETAILED DESCRIPTION OF THE PREFERRED EMBODIMENTS

Figure 4:
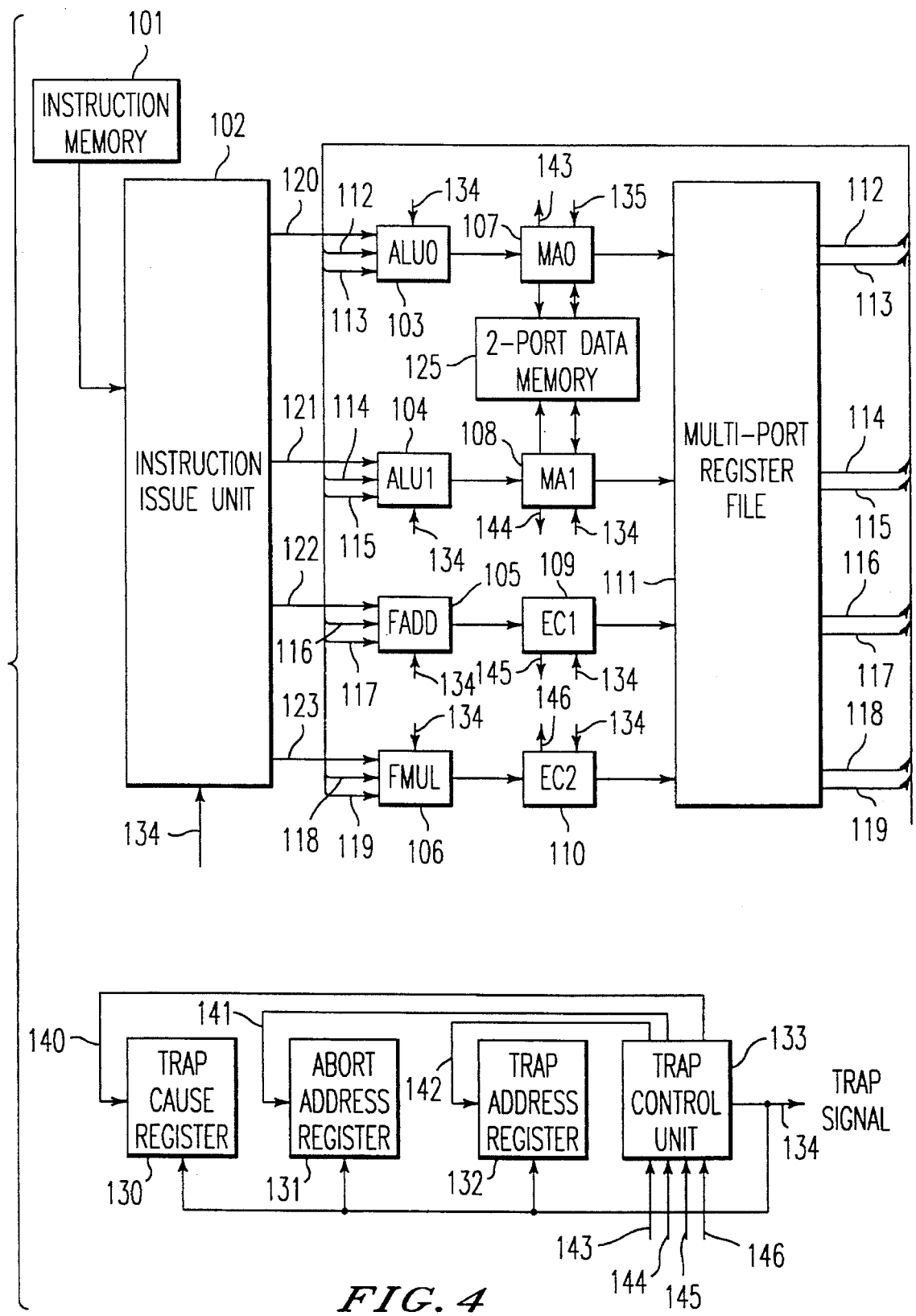
FIG. 4 is a block diagram of the first embodiment of a parallel processing type processor system according to the present invention.
Figure 5:
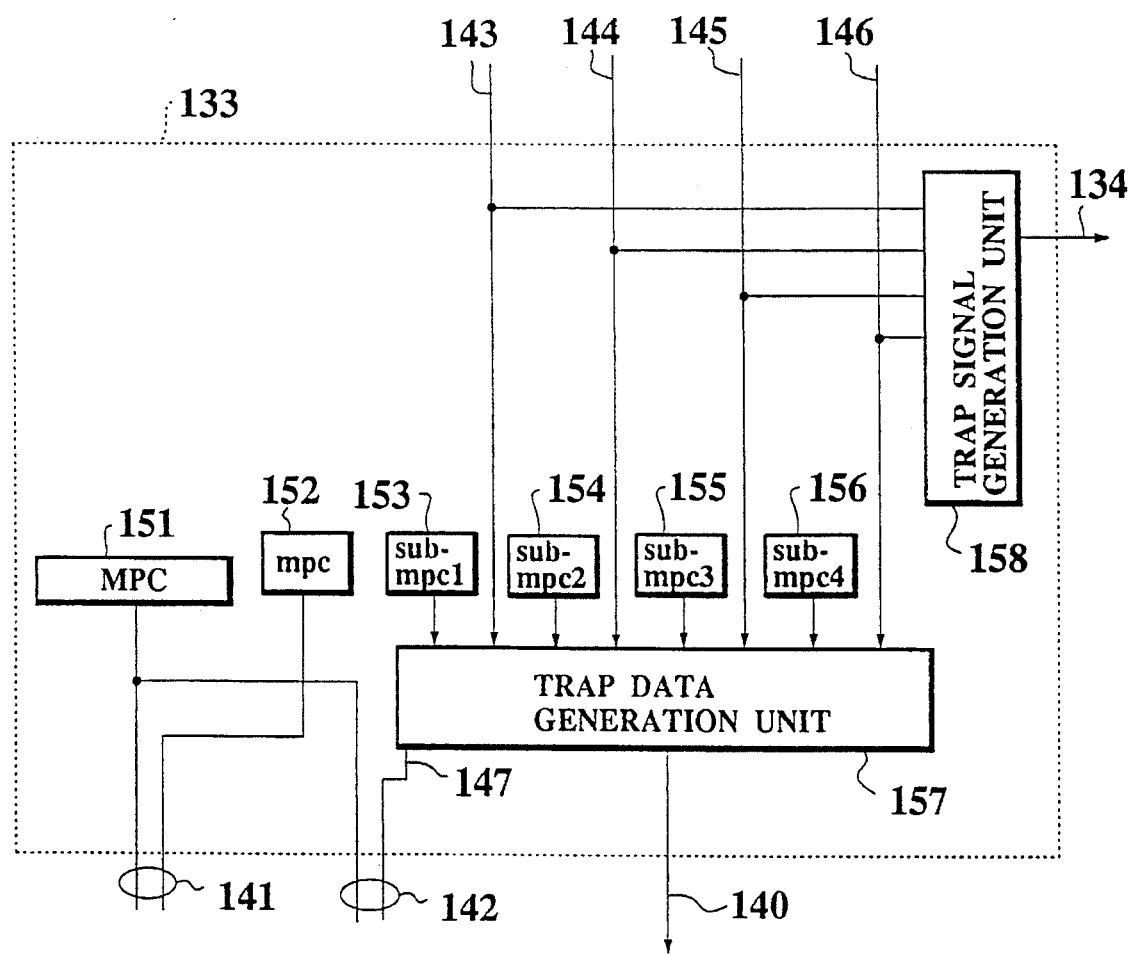
FIG. 5 is a detailed block diagram of a trap control unit in the parallel processing type processor system of FIG. 4.
Figure 6:
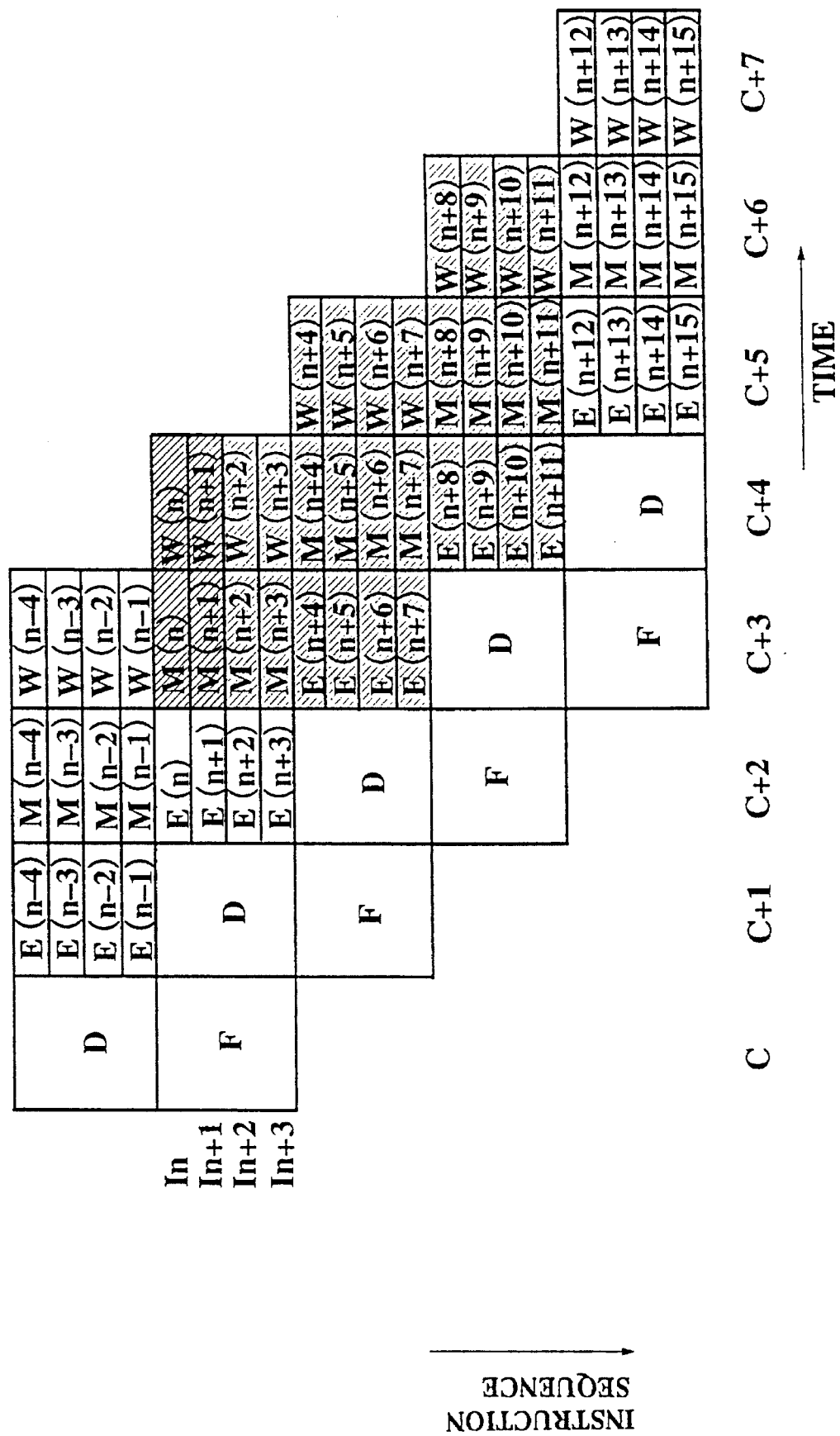
FIG. 6 is a diagram of a progress of pipe line processing in the parallel processing type processor system of FIG. 4 when the trap request occurred In the execution of the program of FIG. 3A.

Referring now to FIG. 4 to FIG. 6, the first embodiment of a parallel processing type processor system according to the present invention will be described in detail.

This configuration of FIG. 4 realizes a processor system capable of performing parallel processing at instruction level which has five step pipe line stages including F stage (Fetch), D stage (Decode), E stage(Execution), M stage (Memory access), and W stage (register Write back), in which each instruction is given in a length of one word (32 bits).

In this first embodiment, as shown in FIG. 4, the processor system comprises: an instruction memory 101 for storing instructions; an instruction issue unit 102 for fetching four instructions of four word boundary concurrently from the instruction memory 101 at the F stage, accounting for the data dependency relationship and control dependency relationship among the four fetched instructions at the D stage, and supplying executable instructions through instruction supply lines 120, 121, 122, and 123 at the E stage; an arithmetic logic units (ALU0 and ALU1) 103 and 104 for carrying out the arithmetic logic calculation and memory address calculation at the stage E according to the instructions supplied from the instruction supply lines 120 and 121, respectively; a floating point adder (FADD) 105 for carrying out the floating point addition and subtraction at the E stage according to the instruction supplied from the instruction supply line 122; a floating point multiplier (FMUL) 106 for carrying out the floating point multiplication and division at the E stage according to the instruction supplied from the instruction supply line 123; memory access units (MA0 and MA1) 107 and 108 for carrying out memory access operations with respect to a two port data memory 125 at the M stage according to the outputs of the ALU0 103 and ALU1 104, respectively; floating point exception check units (EC1 and EC2) 109 and 110 for carrying out exception check in the floating point calculations at the M stage according to the outputs of the FADD 105 and FMUL 106, respectively; and a multi-port register file 111 having twelve ports including four write ports for receiving the outputs of the MA0 107, MA1 108, EC1 109, and EC2 110 at the W stage, and eight read ports for supplying operand data to the ALU0 103, ALU1 104, FADD 105, and FMUL 106 through operand data supply lines 112 to 119 at the E stage.

In this configuration of FIG. 4, the integer calculation exception trap such as a page fault or a overflow is generated by the MA0 107 and MA1 108, while the floating point calculation exception trap is generated by the EC1 109 and EC2 110.

In order to deal with such an exception trap, the processor system is further equipped with a trap cause register 130 for storing a cause of the trap generation; an abort address register 131 for storing an address of the instruction which has the smallest address among those instruction for which the execution has been interrupted by the trap; a trap address register 132 for storing an address of the instruction which caused the trap generation; and a trap control unit 133 for receiving the trap causes from the MA0 107, MA1 108, EC1 109, and EC2 110 transmitted through trap request signal lines 143 to 146, in response to which a trap signal is asserted through trap signal line 134, while generating appropriate inputs for the trap cause register 130, the abort address register 131, and the trap address register 132 through signal lines 140, 141, and 142.

The trap signal in the trap signal line 134 is transmitted to the instruction issue unit 102, ALU0 103, ALU1 104, FADD 105, FMUL 106, MA0 107, MA1 108, EC1 109, and EC2 110, respectively. In response to the trap signal from the trap control unit 133, an execution invalidation flag is activated in each element, so as to abort the processings of the instructions at the later pipe line stages while the instruction issue unit 102 starts the instruction fetch for the prescribed trap treatment routine in which the trap cause, the abort address, and the trap address stored in the trap cause register 130, the abort address register 131, and the trap address register 132, respectively, are utilized.

In further detail, the trap control unit 133 has a configuration shown in FIG. 5. Namely, the trap control unit 133 further comprises: an M stage program counter 1 (MPC) 151 for storing a common portion of word addresses of the instructions currently executed at the M stage in which two least significant bits of the addresses of the instructions are omitted; an M stage program counter 2 (mpc) 152 for storing an individual portion of a word address of the instruction having the smallest address among the instructions currently executed at the M stage, indicating two least significant bits of the address of such an instruction, which is to be combined with the entry of the MPC 151 to generate the abort address 141 to be supplied to the abort address register 131; M stage sub-program counters (submpc1, submpc2, submpc3, submpc4) 153, 154, 155, and 156 for storing individual portions of word addresses of the instructions currently executed at the M stage, indicating two least significant bits of the addresses of the instructions currently executed by the MA0 107, MA1 108, EC1 109, and EC2 110, respectively; a trap data generation unit 157 which outputs the smallest entry among the M stage sub-program counters 153 to 156 as an output 147 to be combined with the entry of the MPC 151 to generate the trap address 142 to be supplied to the trap address register 132, and the trap cause transmitted through one of the trap request signal lines 143 to 146 corresponding to the M stage sub-program counter 153 to 156 having the smallest entry as the trap cause 140 to be supplied to the trap cause register 130; and a trap signal generation unit 158 for generating the trap signal for the trap signal line 134, which is to be asserted whenever a trap cause is received from any one of the trap request signal lines 143 to 146.

Figure 1:
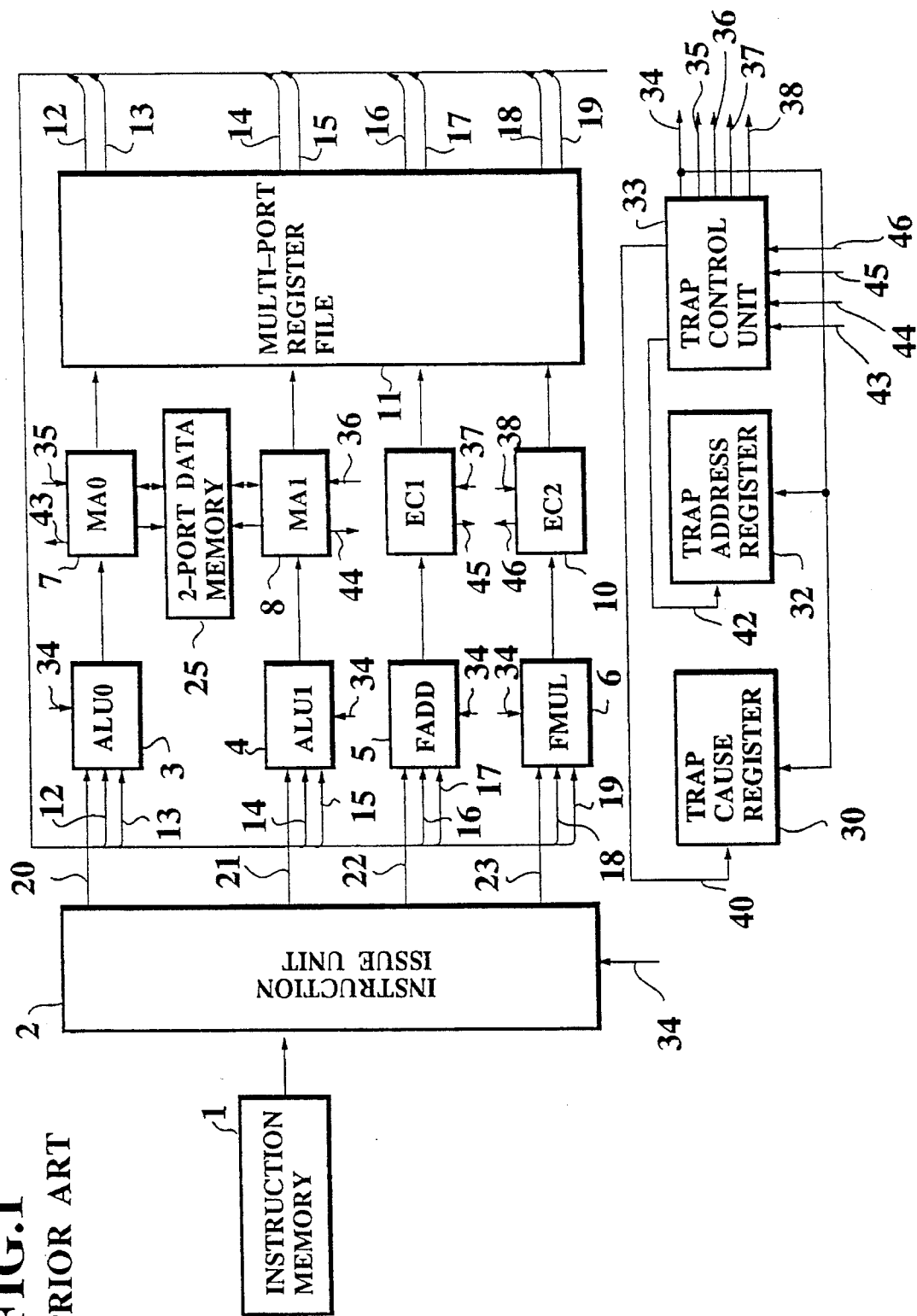
FIG. 1 is a block diagram of a conventional parallel processing type processor system using a conventional trap control method.
Figure 2:
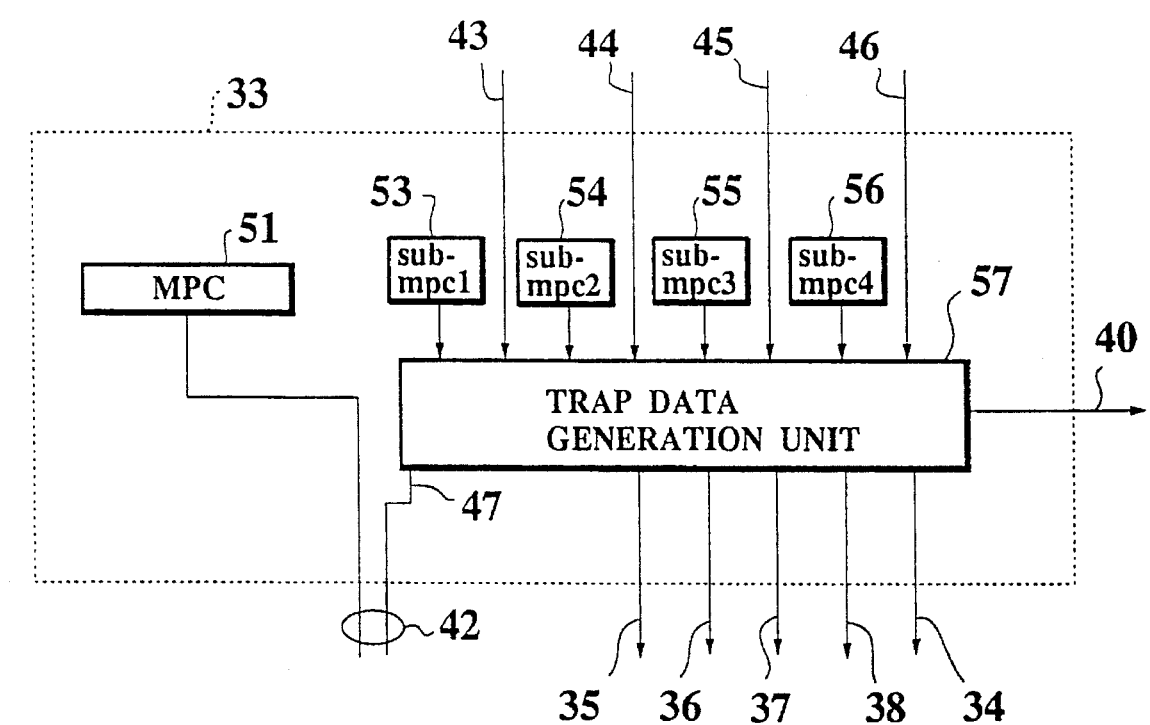
FIG. 2 is a detailed block diagram of a trap control unit in the conventional parallel processing type processor system of FIG. 1.
Figure 3:
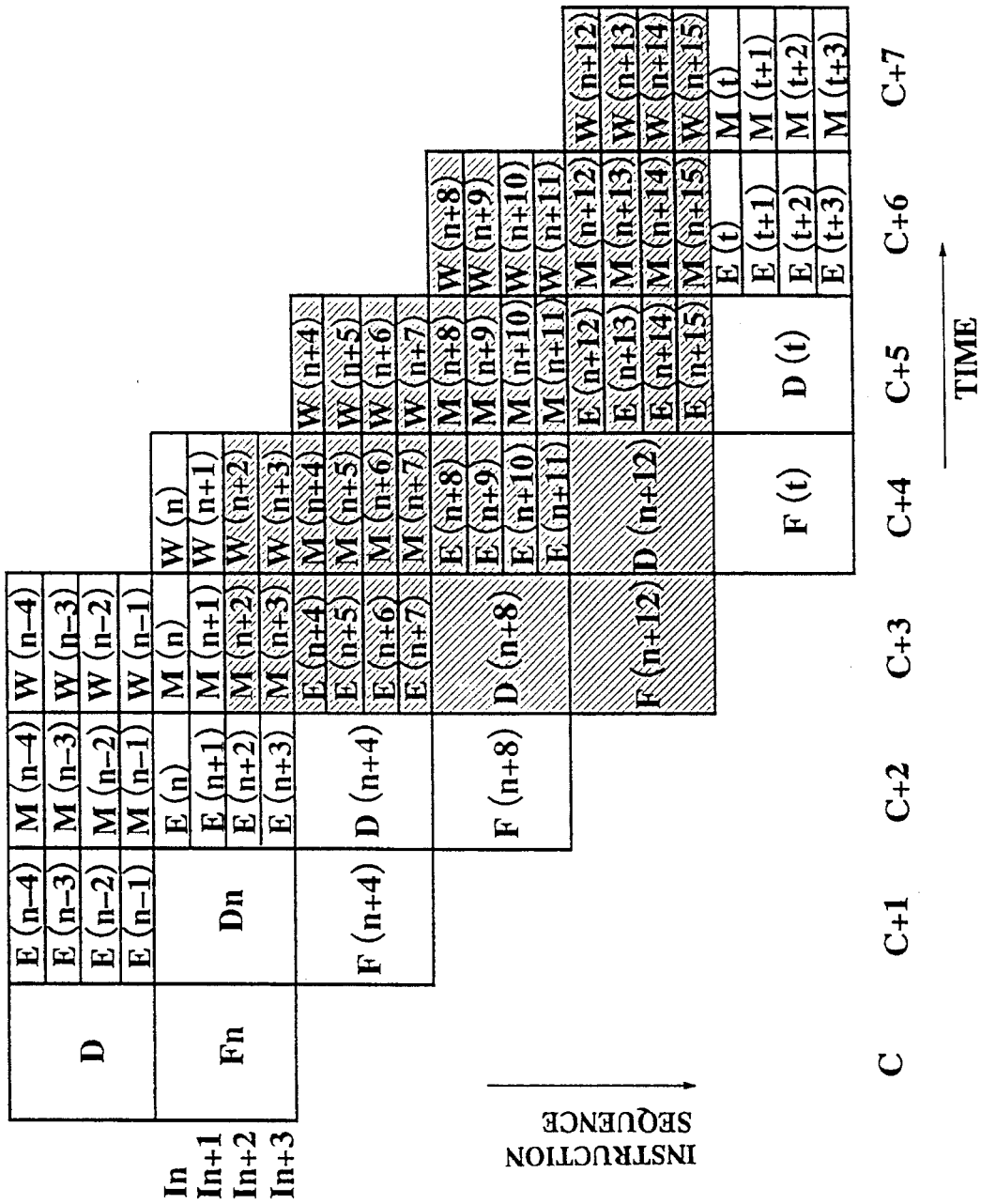
FIG. 3A is an exemplary program to be executed in the parallel processing type processor system.
FIG. 3B is a diagram of a progress of pipe line processing in the conventional parallel processing type processor system of FIG. 1 when the trap request occurred in the execution of the program of FIG. 3A.

FIG. 6 shows a progress of the pipe line processing in the processor system of FIG. 4 in which the page fault occurred at the "load" instruction when the program of FIG. 3A is executed, where the shaded region indicates the instructions aborted. As shown in FIG. 6, in this first embodiment of FIG. 4, when the trap is generated by the execution of the n+2-th "load" instruction during the course of the execution of the program, all of the instructions of the instruction numbers n to n+3 which are concurrently fetched along with the n+2-th instruction which caused the trap are aborted. In comparison with the conventional case shown in FIG. 3B, one might be tempted to consider that the conventional case is more efficient as a number of instructions to be aborted is less in the conventional case, but the conventional case requires the longer cycle time than this first embodiment because of the time required for determining the appropriate trap signals as already mentioned above, so that the efficiency actually becomes higher in this first embodiment.

More specifically, in the pipe line processing shown in FIG. 6, all of the n-th, n+1-th, n+2-th, and n+3-th instructions enter the M stage at the cycle C+3, where the M stage processing for the n-th "fadd" operation is carried out at the EC1 109, the M stage processing for the n+1-th "add" operation is carried out at the MA0 107, the M stage processing for the n+2-th "load" operation is carried out at the MA1 108, and the M stage processing for the n+3-th "fmul" operation is carried out at the EC2 110. In this cycle C+3, when the page fault is detected at the MA1 108, the MA1 108 notifies the occurrence of the page fault trap to the trap control unit 133 through the trap request signal line 144. Here, at this cycle C+3, the MPC 151 stores the word addresses without two least significant bits of the n-th to n+3-th instructions currently executed at the M stage, and the mpc 152 stores the word address indicating two least significant bits of the n-th instruction which has the smallest address among the instructions currently executed at the M stage which is equal to 0 in this case, while the submpc1 153, submpc2 154, submpc3 155, and submpc4 156 store the word addresses indicating two least significant bits of the n+1-th, n+2-th, n-th, and n+3-th instructions, respectively, which are currently executed at the MA0 107, MA1 108, EC1 109, and EC2 110, respectively.

The trap signal generation unit 158 asserts the trap signal in the trap signal line 134 when there is a trap request in any one of the trap request signal lines 143 to 146. The asserted trap signal in the trap signal line 134 is supplied to the instruction issue unit 102, ALU0 103, ALU1 104, MA0 107, MA1 108, FADD 105, FMUL 106, EC1 109 and EC2 110, so that the processings at these units are aborted while the instruction issue unit 102 starts the instruction fetching for the prescribed trap treatment routine.

Here, when the trap data generation unit 157 detects the trap request in the trap request signal line 144, the entry of the submpc2 154 corresponding to this trap request signal line 144 is outputted to the signal line 147, which is then combined with the the entry of the MPC 151 to generate the trap address 142, which in this ease is the address of the n+2-th instruction, such that the address of the n+2-th instruction is stored in the trap address register 132 through the trap address signal line 142.

On the other hand, the abort address signal 141 is obtained by combining the entry of the MPC 151 with the entry of the mpc 152, such that the address of the n-th instruction is stored in the abort address register 131 through the abort address signal line 141.

In addition, the signal in one of the trap request signal lines 143 to 146 which corresponds to one of the submpc1 153, submpc2 154, submpc3 155, and submpc4 156 which stores the smallest address among the M stage sub-program counters associated with the trap request signal lines currently carrying the trap request is outputted to the trap cause signal line 140, and stored in the trap cause register 130. In this case, the trap request is carried by the trap request signal line 144 only, so that the signal in the trap request signal line 144 is outputted to the trap cause signal line 140 and stored in the trap cause register 130.

Here, it is to be noted that although all of the n-th to n+3-th instructions are described as being fetched concurrently above, there is a case in which the entry of the mpc is not equal to 0 as there is a data dependency among the four instructions. Also, in a case two or more trap requests are detected In the trap request signal lines 143 to 146, the entry of one of the submpc1 153, submpc2 154, submpc3 155, and submpc4 156 which stores the smallest address among the instructions currently executed at the M stage is outputted to the signal line 147.

In this embodiment, both the abort address register 131 and the trap address register 132 are necessary because the instruction which caused the trap and the instructions which are aborted are different.

It is also to be noted that, in this embodiment, the entry in the trap signal line can be ascertained very quickly because the trap signal is asserted as soon as there is at least one trap request in any of the trap request signal lines 143 to 146. On the other hand, the trap cause 140 and the trap address 142 to be stored in the trap cause register 180 and the trap address register 132 are determined as a result of the comparison of the entries in the M stage sub-program counters 153 to 156, so that they are not ascertained until much later. However, in general, although it is necessary for the entry in the trap signal line to be ascertained very quickly in order to abort the memory access, the trap data to be stored in the registered may be ascertained much more slowly, so that it is not necessary in this embodiment to make the cycle time of the processor system longer.

Thus, according to this first embodiment, it becomes possible to provide a parallel processing type processor system such as a superscaler processor, incorporating a trap control function capable of operating without increasing the cycle time, such that the lowering of the clock frequency in the system can be prevented.

Figure 7:
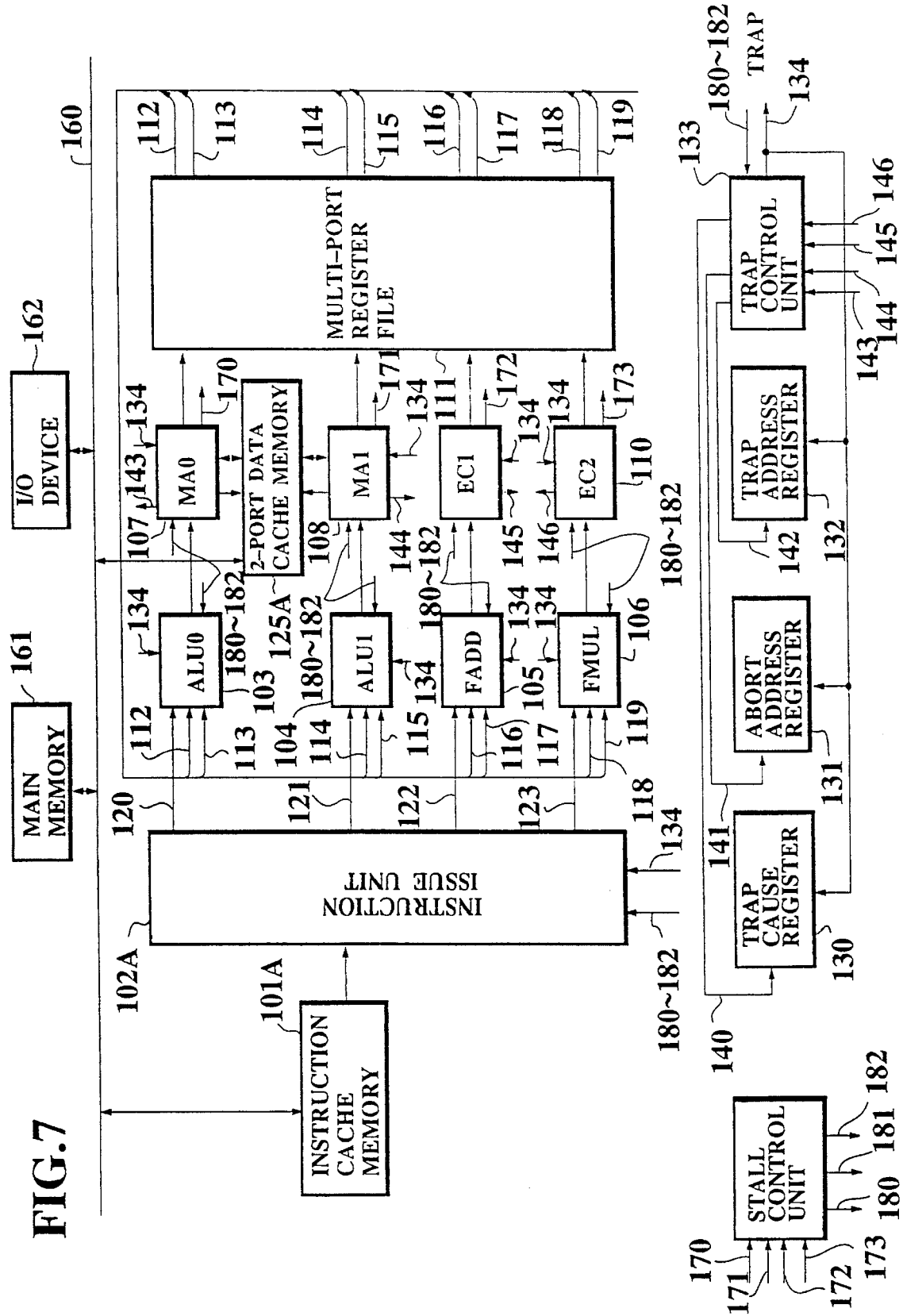
FIG. 7 is a block diagram of the second embodiment of a parallel processing type processor system according to the present invention.

Referring now to FIG. 7 and FIG. 8, the second embodiment of a parallel processing type processor system according to the present invention will be described in detail.

This second embodiment is a modification of the first embodiment described above, which further incorporates a stall control function in addition to the trap control function of the first embodiment, for the following reason.

Namely, when the system of the first embodiment is modified to further include a main memory 161 and an I/O device 162 which are connected with the instruction cache memory 101A and a two port data cache memory 125A through a bus line 160, as shown in FIG. 7, there is a case in which the trap control function alone could lead to a trouble. The source of the trouble here is the I/O device 162 which usually contains a plurality of I/O registers mapped in the memory address. The access to such I/O registers is made by an instruction identical to the memory access instruction which specifies the address of the I/O register, and the cache is usually not used for this purpose. The I/O register is used for setting the commands and parameters to the I/O device 162, and for indicating the status of the I/O device 162 to the processor side, and there is a type of the I/O register which changes the internal state of the I/O register in response to the access for reading the status of the I/O device 162 for example, in such a manner that the status register is cleared when the status of the I/O device 162 is read by the processor side.

In a case of using such an I/O device 162, the system with only the trap control function of the first embodiment described above faces with the following troublesome situation. Namely, in this system, two memory access units 107 and 108 are provided with respect to the two port data cache memory 125A such that two memory access instructions can be executed concurrently. Accordingly, there is a case in which two I/O access instructions at the memory access units 107 and 108 reach the M stage simultaneously. However, there is only one bus line 160 for the purpose of the I/O access, so that it is impossible to complete the processings for two I/O access instructions simultaneously. Consequently, the processing for the first one of the two I/O access instruction must be completed on the I/O device 162 side before the processing for the second one of the two I/O access instruction takes place.

Now, there is a possibility for a case in which the processing of the second I/O access instruction causes the exception such as a bus error. In such a case, if the system uses only the trap control function of the first embodiment described above, both of the first and second I/O access instructions would be aborted. Consequently, when the original program is executed again after the appropriate trap treatment routine is carried out, the first I/O access instruction would be executed again despite of the fact that it is regarded as completed on the I/O device 162 side. In this case, when the first I/O access instruction happens to be the instruction for reading the status register, the status register had already been read once before the occurrence of the trap, so that the content of this status register had already been cleared, and is no longer correct when the first I/O access instruction is executed again.

The trouble just described is basically due to the fact that the conflicting requests for the use of the same calculation resource which cannot be detected at the D stage can occur at the subsequent pipe line stage. Therefore, if it is possible at the D stage to detect that these two memory access instructions are in fact two I/O access instructions, the trouble can be avoided by not supplying these two memory access instructions to the processors simultaneously, but this in turn requires the use of a specialized instruction provided for the I/O access alone.

In the configuration of the second embodiment shown in FIG. 7, this troublesome situation is accounted without using such a specialized I/O access instruction, as follows.

First of all, in this second embodiment, the instruction issue unit 102A controls the supply of the instructions to the ALU0 103 and ALU1 104 such that when the instructions are to be supplied simultaneously to the ALU0 103 and ALU1 104, the instruction having a smaller address which is to be executed first is supplied to the ALU0 103. Thus, when the the memory access instructions reach the MA0 107 and MA1 108 simultaneously, the MA0 107 always has the memory access instruction to be processed first.

Secondly, the configuration of FIG. 7 further includes a stall control unit 163 to which stall request signals are supplied from the MA0 107, MA1 108, EC1 109, and EC2 110 through stall request signals lines 170, 171, 172, and 173, respectively, and in response to the stall request signals entered from the MA0 107, MA1 108, EC1 109, and EC2 110, the stall control unit 163 outputs a stall1 signal 180, a stall2 signal 181, and a stallv1 signal 182 to the instruction issue unit 102A, ALU0 103, ALU1 104, FADD 105, FMUL 106, MA0 107, MA1 108, EC1 109, EC2 110, and the trap control unit 133, so as to carry out the appropriate stall control to be described below.

The stall1 signal 180 is asserted when there is a stall request from any one of the MA0 107, MA1 108, EC1 109, and EC2 110, and the stall2 signal 181 is asserted when there is a stall request from any one of the MA0 107, EC1 109, and EC2 110, while the stallv1 signal 182 indicates the two least significant bits of the instruction for which the processing of the M stage is currently carried out at the MA1 108.

According to the values of these stall1, stall2, and stallv1 signals 180 to 182, the pipe line processings in the system are controlled as follows.

(1) The pipe line <103, 107> of the ALU0 103 and MA0 107:

(a) M stage and W stage:

The pipe line is processed if the stall2 181 is negate, regardless of the stall1 180.

(b) E stage:

The pipe line is processed if the stall1 180 is negate.

(2) The pipe line <104, 108> of the ALU1 104 and MA1 108:

The pipe line is processed if the stall1 180 is negate.

(3) The pipe line <105, 109> of the FADD 105 and EC1 109, and the pipe line <106, 110> of the FMUL 106 and EC2 110:

(a) M stage and W stage:

The pipe line is processed if the stall1 180 is negate.

The pipe line is also processed when the stall1 180 is assert and the stall2 181 is negate, and the stallv1 182 indicates a value larger than the respective one of the submpc3 155 and submpc4 156 which stores two least significant bits of the instruction for which the processing of the M stage is currently carried out at the respective one of the EC1 109 and EC2 110.

(b) E stage:

The pipe line is processed if the stall1 180 is negate.

Also, in this second embodiment, the value stored in the mpc 152 is determined according to the values of these stall1, stall2, and stallv1 signals 180 to 182, as follows. Namely, when the stall1 180 is not asserted, the mpc 152 is loaded with the smallest address of the instructions executed at the E stage, and when both the stall1 180 and stall2 181 are asserted, the mpc 152 maintains the previous value, whereas when the stall1 180 is asserted but the stall2 181 is not asserted, the mpc 152 is loaded with the value indicated by the stallv1 182.

Accordingly, in this second embodiment, when there is a stall request from only the MA1 108, the processing of the pipe line <103, 107> is completed, while the processing of each of the pipe lines <105, 109> and <106, 110> is completed only when the address of the currently processed instruction is smaller than the address of the instruction at the MA1 108.

Consequently, when the first and second I/O access instructions simultaneously reach the MA0 107 and MA1 108, respectively, the MA1 108 outputs the stall request to the stall control unit 163, whereas the MA0 107 does not output the stall request unless it is impossible to complete the I/O access operation in one clock cycle. Then, when the EC1 109 and EC2 110 also do not output the stall requests, only the stall1 180 is asserted while the stall2 181 is not asserted. In such a case, the pipe line <103, 107> is processed to the completion, while mpc 152 is loaded with the value of the stallv1 182, such that the state of the system becomes that in which the instructions prior to the second I/O access instruction have been completed.

Therefore, even when the exception occurs for the second I/O access instruction, the first I/O access instruction will not be executed again. On the other hand, the processing of the pipe line <104, 108> as well as the processings of the pipe lines for the instructions with addresses larger than that of the second I/O access instruction will be stalled until the stall1 180 becomes negate.

When the MA0 107 outputs the stall request as it is impossible to complete the I/O access operation in one clock cycle, all the pipe lines will be stalled as both the stall1 180 and the stall2 181 are asserted, until the stall2 181 becomes negate when the first I/O access instruction is completed.

FIG. 8B shows a progress of the pipe line processing in the processor system of FIG. 4 in which the bus error occurred at the n+2-the "load" instruction when the program of FIG. 8A is executed. As shown in FIG. 8B, in this second embodiment of FIG. 7, when the stall request is generated by the execution of the n+2-th "load" instruction at the cycle C+3, the M stage processing for the n-th "fadd" operation carried out at the EC1 109 and the M stage processing for the n+1-th "add" operation carried out at the MA0 107 are completed at the next cycle C+4; whereas the M stage processing for the n+2-th "load" operation at the MA1 108 and the M stage processing for the n+3-th "fmul" operation at the EC2 110 are stalled at the next cycle C+4 and not completed until the later cycle C+5. Meanwhile, the processings of all the subsequent instructions with addresses larger than the n+2-th instruction are also stalled at the cycle C+4.

Here, after the processings of the instructions are stalled as it is not possible to deny a possibility for an occurrence of an exception in the execution of the instructions, the processings of the instructions are aborted when the exception has actually occurred in the execution of the instructions, or the processings of the instructions are resumed when the exception has actually not occurred in the execution of the instructions.

Thus, according to this second embodiment, it becomes possible to provide a parallel processing type processor system such as a superscaler processor, incorporating trap and stall control functions capable of operating without increasing the cycle time, such that the lowering of the clock frequency in the system can be prevented.

Figure 9:
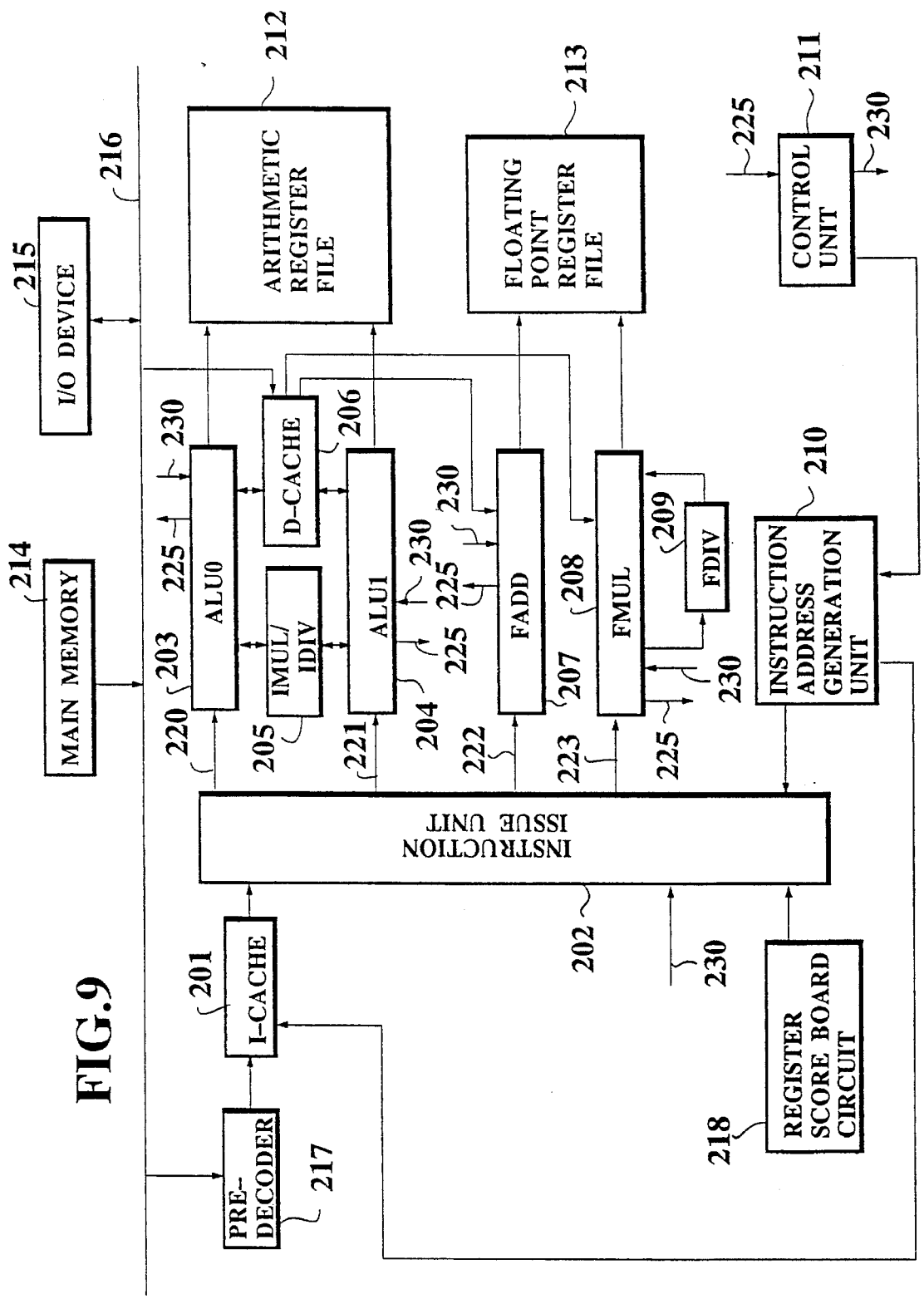
FIG. 9 is a block diagram of the third embodiment of a parallel processing type processor system according to the present invention.

Referring now to FIG. 9, the third embodiment of a parallel processing type processor system according to the present invention will be described in detail.

This third embodiment incorporates a generalization of the stall control function of the second embodiment described above for a more general setting.

In this third embodiment, as shown in FIG. 9, the processor system comprises: an instruction cache memory (I-cache) 201 for storing instructions; an instruction issue unit 202 for fetching four instructions of four word boundary concurrently from the I-cache 201 at the F stage, accounting for the data dependency relationship and control dependency relationship among the four fetched instructions at the D stage, and supplying executable instructions through instruction supply lines 220, 221, 222, and 223 at the E stage; an arithmetic logic units (ALU0 and ALU1) 203 and 204 for carrying out the arithmetic logic calculation and memory address calculation at the stage E according to the instructions supplied from the instruction supply lines 220 and 221, respectively; an integer multiplier and divider 205 for carrying out the integer multiplication and division at the E stage according to the commands from the ALU0 203 and the ALU1 204; a data cache memory (D-cache) 206 for storing data to be accessed from the ALU0 203 and ALU1 204; a floating point adder (FADD) 207 for carrying out the floating point addition and subtraction at the E stage according to the instruction supplied from the instruction supply line 222; a floating point multiplier (FMUL) 208 for carrying out the floating point multiplication at the E stage according to the instruction supplied from the instruction supply line 223; a floating point divider (FDIV) 209 for carrying out the floating point division at the E stage according to the command from the FMUL 208; an instruction setting address generation unit 210 for specifying the instructions to be issued from the instruction issue unit 202; a control unit 211 for carrying out the trap control and the stall control to be described in detail below: an arithmetic register file 212 for storing the outputs of the ALU0 203 and ALU1 204; and a floating point register file 213 for storing the outputs of the FADD 207 and FMUL 208.

Just as in the second embodiment of FIG. 7 described above, the processor system of FIG. 9 further includes: a main memory 214 for storing data to be cached into the I-cache 201 and the D-cache 206; an I/O device 215 including I/O registers; and a bus line 216 through which the main memory 214 and the I/O device 215 are connected with the I-cache 201 and the D-cache 206.

In addition, the processor system of FIG. 9 further incorporates: a pre-decoder 217 provided between the I-cache 201 and the bus line 216; and a register score board circuit 218 associated with the instruction issue unit 202, both of which will be described in detail below.

Now, the trap and stall control operations in this third embodiment will be described in detail.

In general, it is necessary for a parallel processing type processor system to have a mechanism for preventing the occurrence of conflicting requests for using the same resource at a time of the execution of the machine language instructions, and a mechanism for maintaining a reasonableness in the execution order for the machine language instructions. Here, the reasonableness in the execution order implies a consistency in the data dependency relationship and the control dependency relationship.

In order to maintain the consistency in the data dependency relationship, it is necessary to maintain the execution order to be one of D→S relation, S→D relation, and D→D relation, where D→S relation indicates a relation in which the resource for storing the result of the instruction to be executed earlier is identical to the resource from which the source data to be used in the instruction to be executed later is read out, S→D relation indicates a relation in which the resource for storing the result of the instruction to be executed earlier is identical to the resource for storing the result of the instruction to be executed later, and D→D relation indicates a relation in which the resource from which the source data to be used in the instruction to be executed earlier is read out is identical to the resource from which the source data to be used in the instruction to be executed later is read out. In this third embodiment of FIG. 9, there are two resources for storing the data in forms of register and memory, so that it is necessary to maintain the consistency in the data dependency relationship among both of them.

The control dependency relationship is a relation between the earlier branch instruction and the subsequent instruction. For the branch instruction in a conventional VLIW type processor, the consistency of this control dependency relationship is maintained by means of a compiler. However, the parallel processing type processor system of this third embodiment must have an object compatibility with respect to the user programs, so that the maintaining of the consistency in the control dependency relationship must be realized in a form of hardware.

In this third embodiment, the processor system fetches four instructions of four word boundary concurrently, and the instructions which can be issued simultaneously in in-order sequence among the four instructions are issued to the processing units, and the executions of the instructions are completed in in-order sequence.

In this third embodiment, the hardware for preventing the occurrence of conflicting requests to use the same resource, and maintaining the consistency in the data dependency relationship and control dependency relationship involves two mechanisms. The first part is the instruction issue mechanism realized by the instruction issue unit 202, and the second part is the stall mechanism realized by the control unit 211.

In order to realize the instruction issue mechanism, the instruction issue unit 202 is associated with the pre-decoder 217 for detecting the occurrence of the conflicting requests to use the same resource which marks the resource in use for the four fetched instructions at a time of the refilling to the cache (or a time of the instruction fetch in a case of the cache through instruction fetch) as well as whether there is a conflict for the instruction having the smallest address among the concurrently fetched instructions. The instruction issue unit 202 is also associated with the register score board circuit 218 for detecting the D→S and D→D relations, such that the instruction issue unit 202 can carries out the instruction issue operation in in-order sequence at the D stage by preventing the conflict marked by the pre-decoder 217 while maintaining the D→S and D→D relations in the data dependency relationship and the control dependency relationship detected by the register score board circuit 218. As for the S→D relation, it is maintained by carrying out the instruction issue in in-order sequence and the execution completion in in-order sequence after the source register is read out.

Moreover, in this third embodiment, because it is possible to execute two memory access instructions concurrently, it is also necessary to maintain the consistency in the conflicting relationship of the memory resources as well as the data dependency relationship for the memory resources. The instruction issue unit 202 carried out the operations by presuming the absence of these relationships because the instruction issue unit 202 operates before the D stage so that it is not possible for the instruction issue unit 202 to ascertain whether these relationships exist or not accurately. The existence of these relationships cannot be determined accurately until the M stage, and although it is possible to determine the possibility for the existence these relationships, the performance would be severely limited when the instruction supply operation is controlled overly excessively according to such a possibility.

In the stall mechanism, the execution completion is kept in in-order sequence, and the control is carried out for a case other than those already accounted by the instruction issue mechanism, and for a case in which the instruction issue operation is too fast for the instruction fetch operation to keep up with.

In the execution completion in in-order sequence, the completion of the execution of the instruction is achieved while observing the basic principle that the executions of the instructions issued concurrently from the D stage are completed concurrently. However, when the memory access operation by the memory access instruction X executed at the M stage by the ALU1 204 cannot be finished within one cycle time, the instructions having addresses smaller than that of this memory access instruction X are completed regardless of the stall request due to the instruction X, and the mpc is updated for a number of instructions for which the executions are completed, just as in the second embodiment above. This function is called the grouping function at the execution completion stage. In this third embodiment, when the ALU0 203 and the ALU1 204 executes the instructions concurrently, the instruction issue unit 202 carries out the control such that the ALU0 203 always executes the instruction with the smaller address, so that the execution completion in in-order sequence is guaranteed. By this control of the instruction issue unit 202, the dead lock due to the occurrence of conflicting requests to use the same memory resource which cannot be detected at the D stage can be prevented at the M stage.

Such a control for completing the pipe line processings for only those instructions which have addresses smaller than that of the instruction making the stall request may equally well be applied to other situations, such as a case in which the M stage processing at the ALU0 203 cannot be completed in one cycle, and/or a case in which the stall request is asserted as the possibility for the trap cannot be denied for the instruction executed at the E2 stage of FADD 207 or FMUL 208.

The instruction issue unit 202 does not account for the occurrence of the conflicting requests to use the same resource or the data dependency relationship as far as the memory (including cache memory) is concerned. In order to secure the prevention of the occurrence of the conflicting requests to use the same resource and the maintenance of the data dependency relationship, only the "load" and "store" instructions must be taken into consideration because the processor system of this third embodiment adopts the so called "load, store" architecture just as in the RISC. The resource conflict does not occur as long as one of the ALU0 203 and the ALU1 204 is making an access to the D-cache 206 because the D-cache 206 has the dedicated ports for the ALU0 203 and the ALU1 204. Thus, when the "load" and "store" instructions make accesses to the external memory simultaneously, the data dependency relationship exists only when these two instructions make accesses to the same address.

The memory resource conflict is resolved by the instruction grouping function at the execution completion stage. The consistency in the data dependency relationship for the memory includes "read after write", "write after read", and "write after write", which is maintained at the cache memory side.

Referring now to FIG. 10 to FIG. 20, the stall control in the third embodiment of FIG. 9 will be described in detail.

The cases which causes the stall in this third embodiment can be summarized as follows:

M0busy

M1busy

Imis (I-cache miss)

FRbusy (FPU register write conflict)

FAexch (FADD exception check)

FMexch (FMUL exception check)

FDexch (FDIV exception check)

Fstall (Forceful Stall)

The condition under which a stall request signal corresponding to each of these cases is asserted is as follows.

M0busy, M1busy:

These types of the stall request signal are asserted when the memory access operation (including access operations with respect to the cache and the I/O) is carried out at the M stage at the t-th cycle, and this memory access operation cannot be completed within this t-th cycle.

Imis:

This type of the stall request signal is asserted when there is a new instruction fetch request but the instruction fetch is unsuccessful.

The exemplary cases in which the stall is caused by this Imis stall request signal are shown in FIG. 10 to FIG. 14, where the Imis stall request signal is actually asserted when the instruction is not fetched to the instruction register after one clock cycle from the loading of a new value to "fpc" and the assertion of "fpcen".

Figure 10:
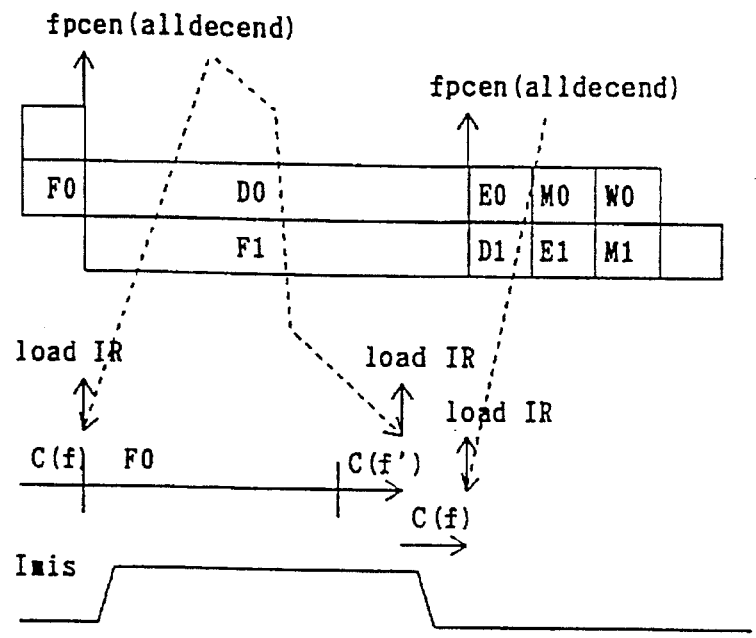
FIGS. 10 to 14 are timing chart diagrams showing exemplary cases of a stall due to the Imis (instruction cache miss) signal in the parallel processing type processor system of FIG. 9

FIG. 10 shows a case of a stall due to the I-cache miss at a time of instruction fetch.

Figure 11:
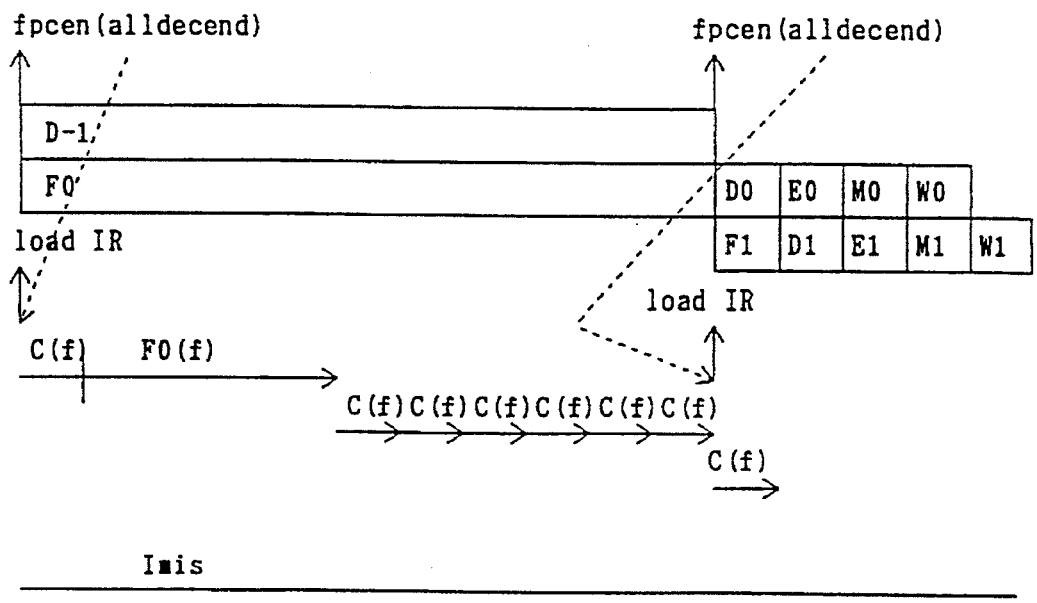

FIG. 11 shows a case in which after the stall due to the I-cache miss has occurred at a time of instruction fetch, the other stall request has occurred at the other part of the system, and the stall due to the I-cache miss has been resolved before the other stall is resolved.

Figure 12:
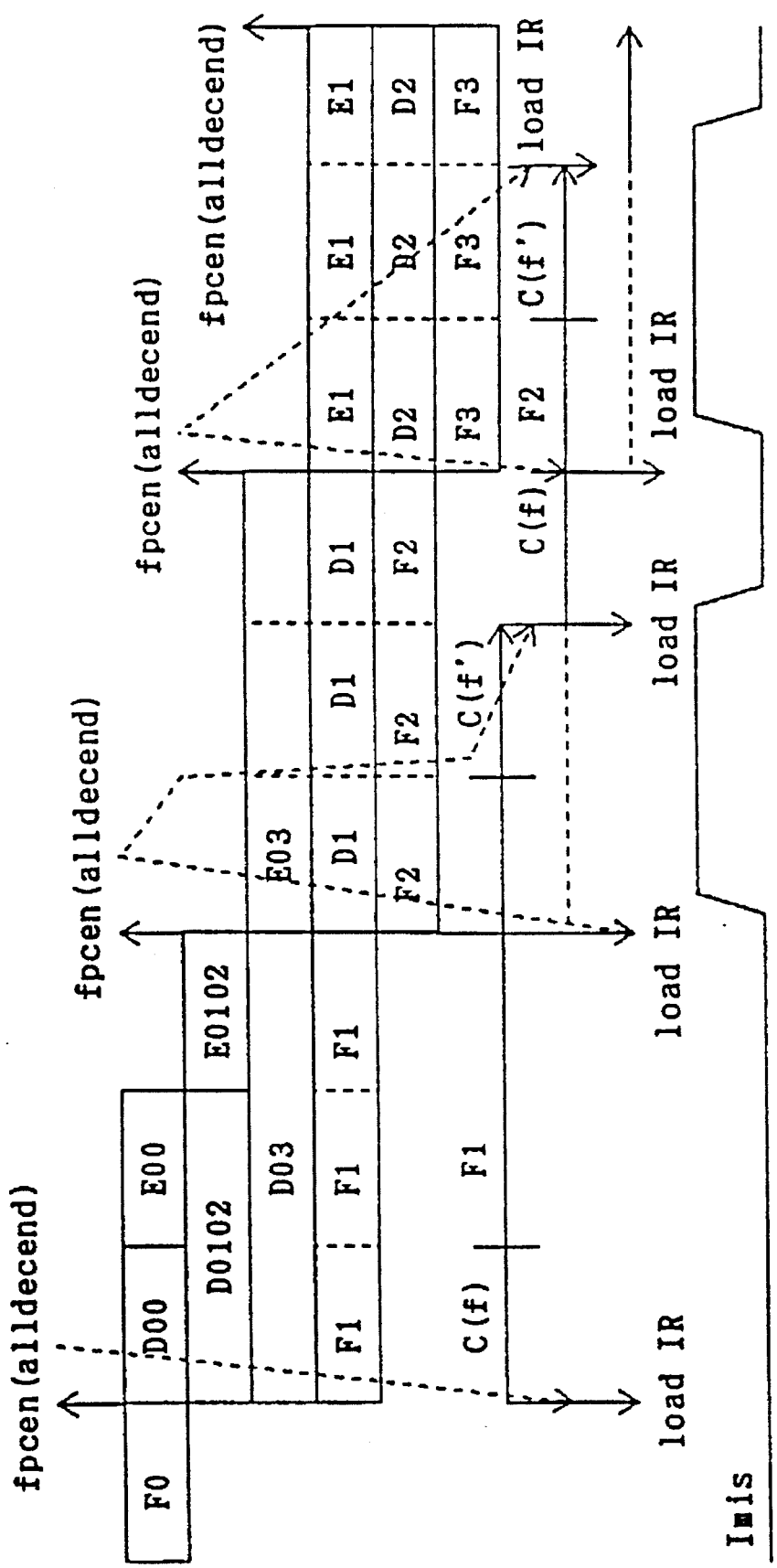

FIG. 12 shows a case in which the stall due to the I-cache miss has occurred at the same time the other stall has occurred at the other part of the system, and the other stall at the other part of the system has been resolved before the stall due to the I-cache miss is resolved.

Figure 13:
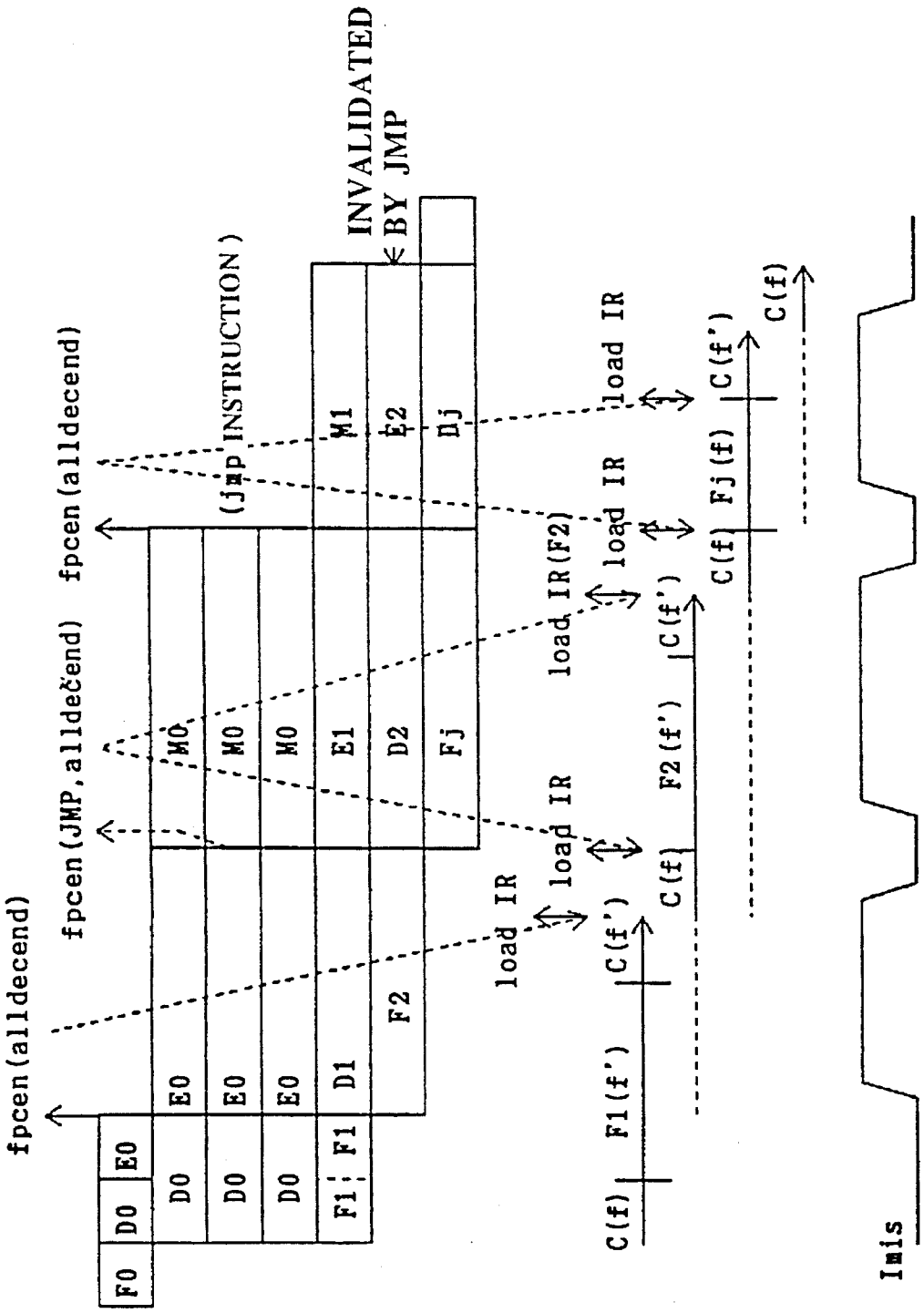

FIG. 13 shows a case in which the stall due to the I-cache miss has occurred at a time of instruction fetch at a jump target of the jump instruction.

Figure 14:
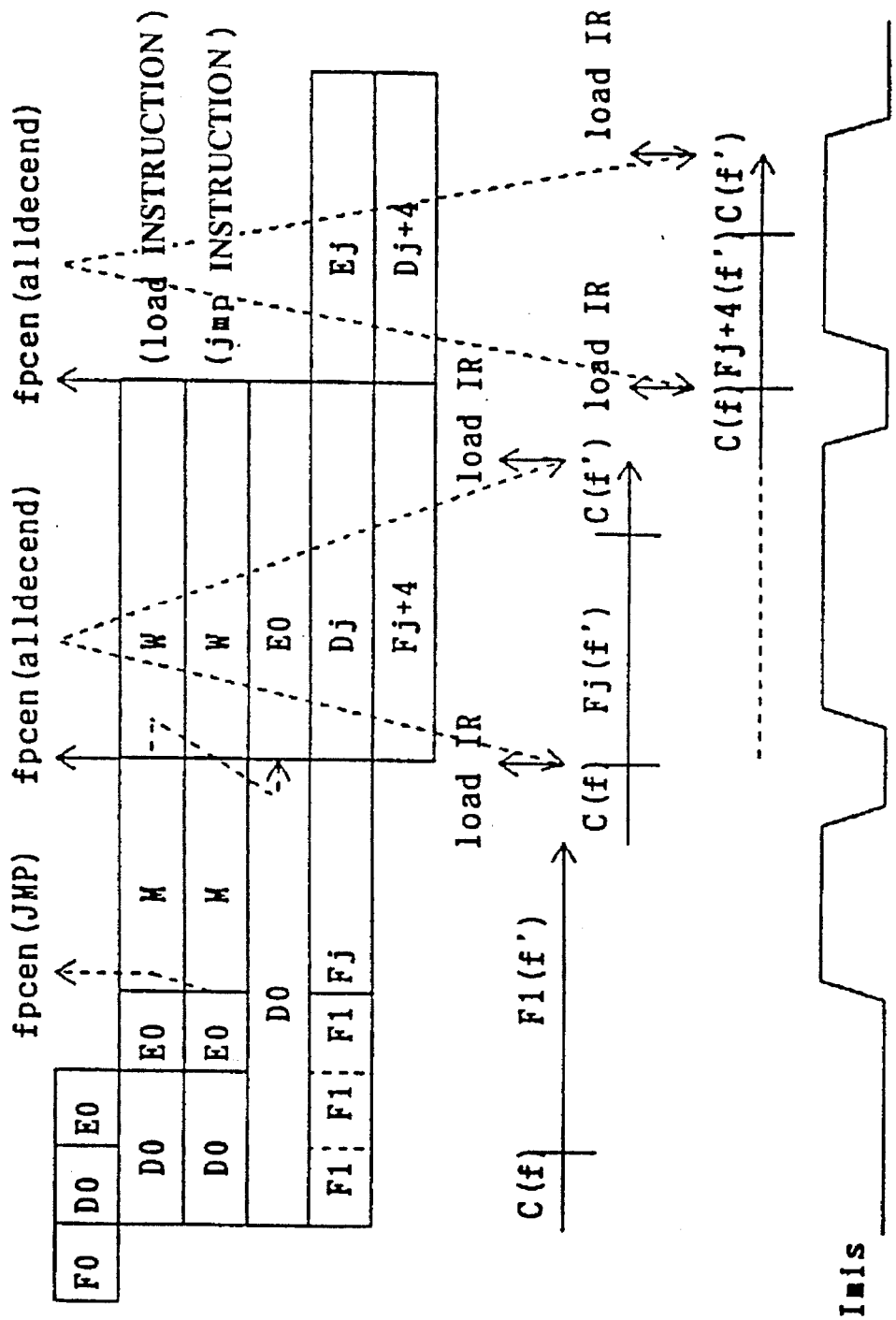

FIG. 14 shows a case in which the jump has occurred during the cache refilling operation associated with the stall due to the I-cache miss.

FRbusy:

This type of the stall request signal is asserted by the FDIV 209 at the E2 stage of the pipe line when the FMUL 208 is also at the E2 stage, in order to stall the pipe lines other than that of the FDIV for one cycle, so as to avoid the conflict in writing into the floating point register file 213 between the FMUL 208 and FDIV 209.

FAexch:

At the E1 stage of the FADD 207, when a possibility of the occurrence of a trap cannot be denied, the pipe line processing at the FADD 207 is changed from a usual F1 type to an F2 type. In this case, the execution completion stage at the FADD 207 is going to be the M stage, so that the processings of the other units are stalled by asserting this FAexch stall request signal in order to delay the execution completion stage of the other units during the E2 and E3 stages of the FADD 207, so as to have all the units reaching to the execution completion stage at the same time as the M stage of the FADD 207. Such a situation in which the stall is caused by this FAexch stall request signal is shown in FIG. 15, where the processings of the instructions "Iadd" and "fmul" which are fetched concurrently with the "fadd" instruction as well as the processings of the instructions "fadd", "Iadd", and "fmul" which are fetched at next cycle are stalled during the E2 and E3 stages of the processing of the "fadd" instruction.

FMexch:

At the E1 stage of the FMUL 208, when a possibility of the occurrence of a trap cannot be denied, the pipe line processing at the FMUL 208 is changed from a usual F1 type to an F2 type. In this case, the execution completion stage at the FMUL 208 is going to be the M stage, so that the processings of the other units are stalled by asserting this FMexch stall request signal in order to delay the execution completion stage of the other units for two cycles, so as to have all the units reaching to the execution completion stage at the same time as the M stage of the FMUL 208.

FDexch:

At the E1 stage of the FDIV 209, when a possibility of the occurrence of a trap cannot be denied, the pipe line processing at the FDIV 209 is changed from a usual D1 type to an D2 type. In this case, the execution completion stage at the FDIV 209 is going to be the M stage, so that the processings of the other units are stalled by asserting this FDexch stall request signal in order to delay the execution completion stage of the other units until the FDIV 209 goes through the E3 stage, so as to have all the units reaching to the execution completion stage at the same time as the M stage of the FDIV 209. Such a situation in which the stall is caused by this FDexch stall request signal is shown in FIG. 16, where the processings of the instructions "iadd" and "fadd" which are fetched concurrently with the "fdiv" instruction are stalled until the processing of the "fdiv" instruction goes through the E3 stage.

Fstall:

This type of the stall request signal is asserted externally, in order to lock every pipe line processing before the execution completion stage, except for the operations such as a cache miss recovery operation.

Figure 17:
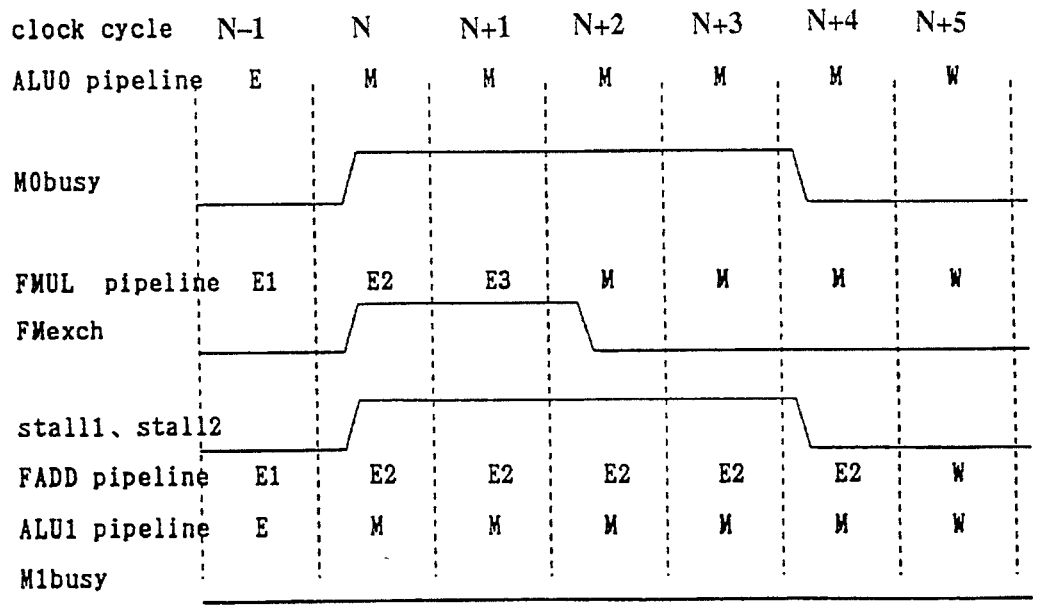
FIGS. 17 to 19 are timing chart diagrams showing exemplary cases of stall control operation in the parallel processing type processor system of FIG. 9.
Figure 18:
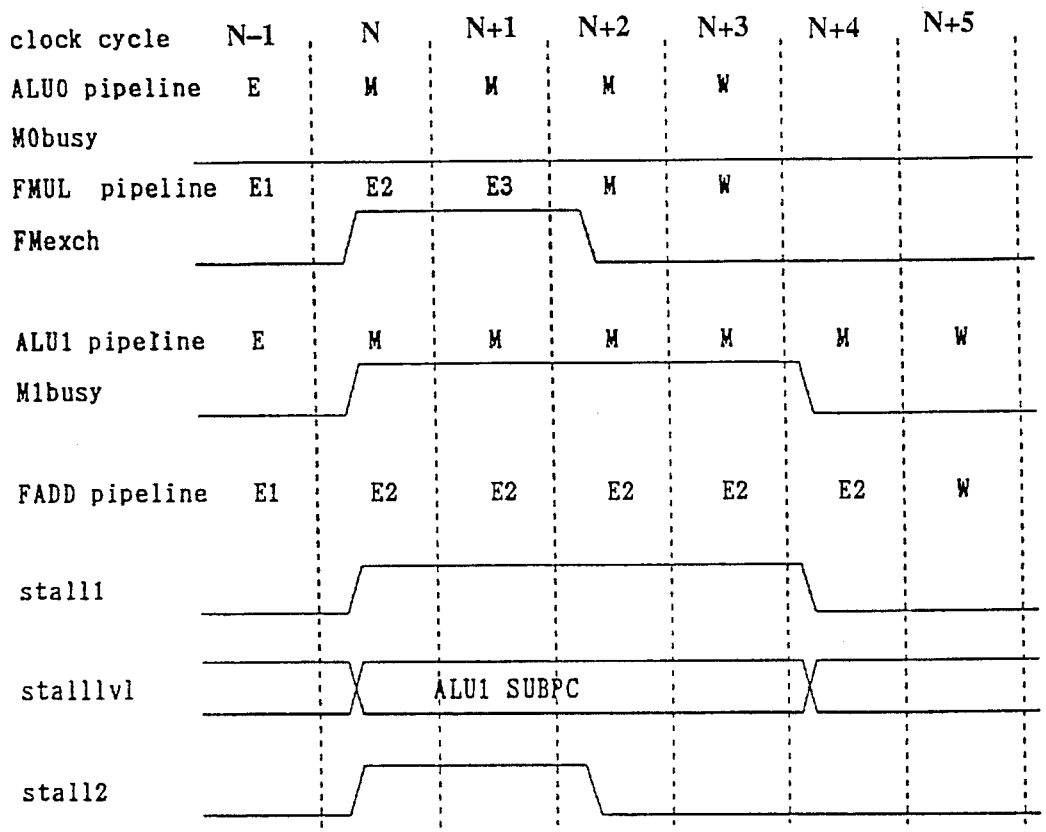
Figure 19:
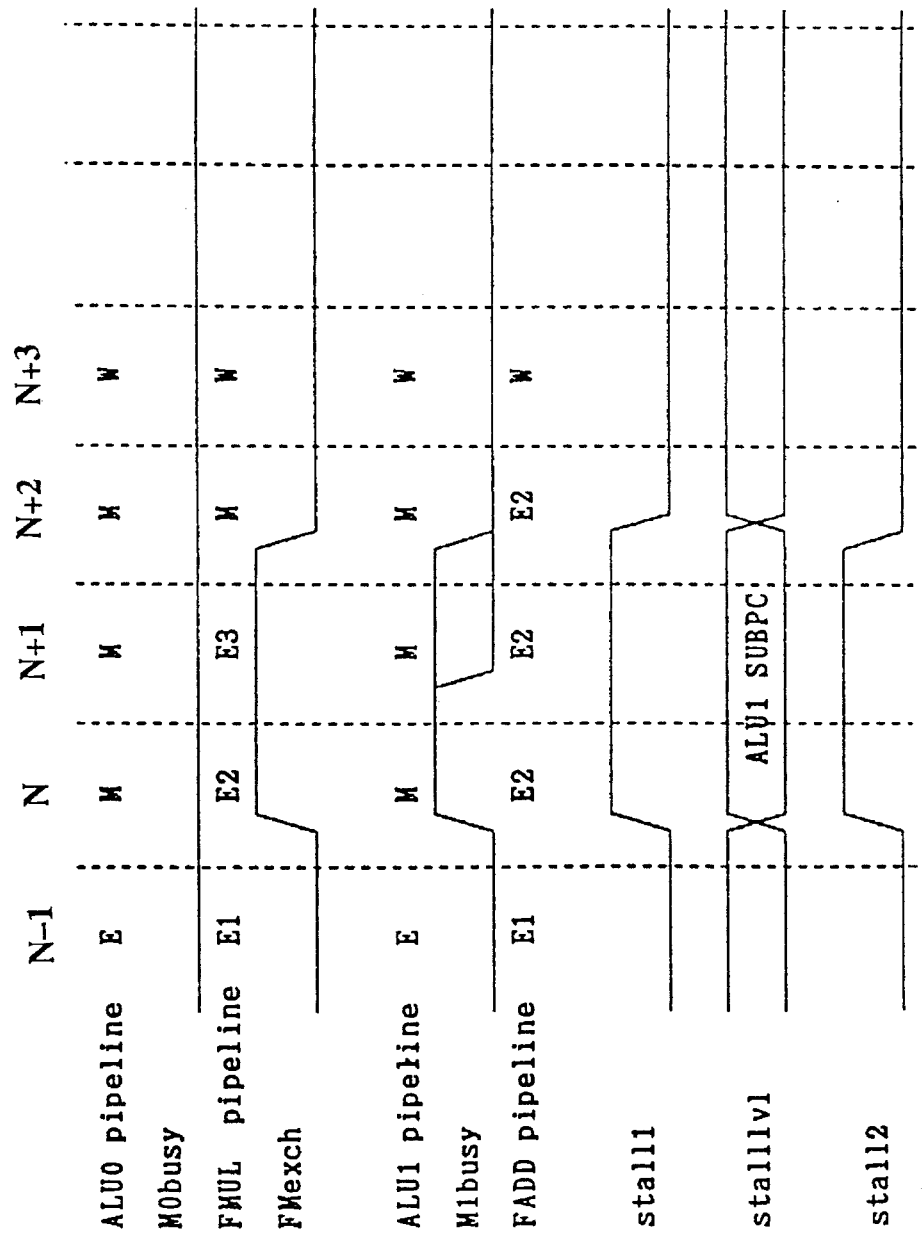

FIG. 17 to FIG. 19 show exemplary timing charts for the stall control in this third embodiment.

In the timing chart of FIG. 17, a cache miss is detected at the M stage of the ALU0 203 at the N-th cycle, so that the M0busy signal is asserted and the cache mis recovery operation is started. Meanwhile, a possibility for the occurrence of a trap cannot be denied for the FMUL 208, so that the FMexch signal is asserted, and the stall1 and stall2 signals are asserted.

At the N+2-th cycle, the cache miss recovery operation for the ALU0 203 is continued, while the FMUL 208 did not cause the exception so that the FMexch signal is negated. However, as the stall1 and stall2 signals are still asserted, the execution of the FMUL 208 cannot be completed.

At the N+4-th cycle, the cache miss recovery operation for the ALU0 203 is completed, so that the M0busy signal is negated as it can be completed within that cycle. Accordingly, the stall1 and stall2 signals are negated, so that the execution at all the other units can be completed.

Finally, at the cycle N+5, the execution of all the instructions is completed.

In the timing chart of FIG. 18, where it is assumed that the addresses of the instructions at the processing units are such that ALU0 203<ALU1 204 and FMUL 208<ALU1 204<FADD 207. In this case, a cache miss is detected at the M stage of the ALU1 204 at the N-th cycle, so that the M1busy signal is asserted and the cache mis recovery operation is started. Meanwhile, a possibility for the occurrence of a trap cannot be denied for the FMUL 208, so that the FMexch signal is asserted, and the stall1 and stall2 signals are asserted.

At the N+2-th cycle, the cache miss recovery operation for the ALU1 204 is continued, while the FMUL 208 did not cause the exception so that the FMexch signal is negated. At this point, the stall2 signal is negated so that the execution at the ALU0 203 and the FMUL 208 can be completed, but as the stall1 signal is still asserted, the execution of the FADD 207 cannot be completed.

At the N+4-th cycle, the cache miss recovery operation for the ALU1 204 is completed, so that the M1busy signal is negated as it can be completed within that cycle. Accordingly, the stall1 signal is negated, so that the execution the FADD 207 can be completed.

Finally, at the cycle N+5, the execution of all the instructions is completed.

In the timing chart of FIG. 18, a cache miss is detected at the M stage of the ALU1 204 at the N-th cycle, so that the M1busy signal is asserted and the cache mis recovery operation is started. Meanwhile, a possibility for the occurrence of a trap cannot be denied for the FMUL 208, so that the FMexch signal is asserted, and the stall1 and stall2 signals are asserted.

At the N+2-th cycle, the cache miss recovery operation for the ALU1 204 is completed, so that the M1busy signal is negated, and at the same N+2-th cycle or at the preceding N+1-th cycle the FMUL 208 did not cause the exception so that the FMexch signal is negated. At this point, the stall1 and stall2 signals are also negated so that the execution of all the instructions is completed.

The operations of each pipe line in this third embodiment at each processing stage in response to the stall control operation using the stall1, stall2, and FRbusy signals are summarized in the table shown in FIG. 20. In this FIG. 20, BU stands for a branch unit which is provided in each processing unit in the processor system.

In this third embodiment, after the processings of the instructions are stalled as it is not possible to deny a possibility for an occurrence of an exception in the execution of the instructions, the processings of the instructions are aborted when the exception has actually occurred in the execution of the instructions, or the processings of the instructions are resumed when the exception has actually not occurred in the execution of the instructions.

Thus, according to this third embodiment, it also becomes possible to provide a parallel processing type processor system such as a superscaler processor, incorporating trap and stall control functions capable of operating without increasing the cycle time, such that the lowering of the clock frequency in the system can be prevented.

It is to be noted that many modifications and variations of the above embodiments may be made without departing from the novel and advantageous features of the present invention. Accordingly, all such modifications and variations are intended to be included within the scope of the appended claims.

What is claimed is:

1. An instruction level parallel processing processor system, comprising:

N instruction execution units for executing sequences of instructions concurrently, where N is a non-zero positive integer;

instruction supply means for supplying instructions to be executed by said N instruction execution units concurrently; and trap control means for controlling said N instruction execution units such that when M instructions are supplied concurrently from the instruction supply means to said N instruction execution units, where M is a non-zero positive integer and N≧M, and when an exception is caused in an execution of at least one of said M instructions at one clock cycle, concurrent executions of all of said M instructions supplied to said N instruction execution units are aborted at said one clock cycle by sending abort signals to all of said N instruction execution units at said one clock cycle.

2. The system of claim 1, further comprising:

abort address storing means for storing an address of an instruction which has a smallest address among said M instructions for which the processings are aborted by the trap control means; and trap address storing means for storing an address of an instruction of said M instructions from which said exception is caused.

3. The system of claim 1, wherein said N processor means includes sequentially ordered K processor means having an equivalent function, where K is an integer and M≧K, and the instruction supply means supplied sequentially ordered J instructions to said K processor means, where J is an integer and K≧J>1, the instruction supply means supplies said J instructions to said K processor means such that an instruction of said J instructions which is ordered earlier is supplied to a processor means of said K processor means which is ordered earlier.

4. The system of claim 3, further comprising means for stalling the processings of a part of said J instructions such that when it is not possible to deny a possibility for an occurrence of an exception in the execution of an I-th instruction among said J instructions, the processings of instructions among said J instructions which are ordered later than said I-th instructions are stalled.

5. The system of claim 1, further comprising stall control means for stalling the processings of said M instructions when it is not possible to deny a possibility for an occurrence of an exception in the execution of said M instructions.

6. The system of claim 5, wherein the stall control means aborts the processings of said M instructions when the exception has actually occurred in the execution of said M instructions.

7. The system of claim 5, wherein the stall control means resumes the processings of said M instructions when the exception has actually not occurred in the execution of said M instructions.

8. A method of controlling an instruction level parallel processing processor system, comprising the steps of:

supplying sequences of M instructions to be executed by N instruction execution units of the system concurrently, where N≧M, and N and M are non-zero positive integers; and controlling said N instruction execution units such that when M instructions are supplied concurrently to said N instruction execution units, and when an exception is caused in an execution of at least one of said M instructions concurrently at one clock cycle, concurrent executions of all of said M instructions supplied to said N instruction execution units are aborted at said one clock cycle by sending abort signals to all of said N instruction execution units at said one clock cycle.

9. The method of claim 8, further comprising the step of:

storing an address of an instruction which has a smallest address among said M instructions for which the processings are aborted at the controlling step; and storing an address of an instruction of said M instructions from which said exception is caused.

10. The method of claim 8, wherein said N processor means includes sequentially ordered K processor means having an equivalent function, where K is an integer and M≧K, to which sequentially ordered J instructions are supplied, where J is an integer and K≧J>1, and wherein at the supplying step an instruction of said J instructions which is ordered earlier is supplied to an processor means of said K processor means which is ordered earlier.

11. The method of claim 10, further comprising the step of stalling the processings of a part of said J instructions such that when it is not possible to deny a possibility for an occurrence of an exception in the execution of an I-th instruction among said J instructions, the processings of instructions among said J instructions which are ordered later than said I-th instructions are stalled.

12. The method of claim 8, further comprising the step of stalling the processings of said M instructions when it is not possible to deny a possibility for an occurrence of an exception in the execution of said M instructions.

13. The method of claim 12, further comprising the step of aborting the processings of said M instructions when the exception has actually occurred in the execution of said M instructions.

14. The method of claim 12, further comprising the step of resuming the processings of said M instructions when the exception has actually not occurred in the execution of said M instructions.

15. The system of claim 1, further comprising:

means for handling said exception; and means for concurrently restarting said M instructions aborted by said trap control means after handling said exception.

16. The method according to claim 8, further comprising the steps of:

handling said exception; and concurrently restarting said M instructions aborted by said trap control means after handling said exception.

* * * * *